(12) United States Patent
Nakahara et al.

(10) Patent No.: US 8,094,725 B2
(45) Date of Patent: Jan. 10, 2012

(54) VIDEO CODER, CODING CONTROLLER, AND VIDEO CODING METHOD

(75) Inventors: Yoshihiro Nakahara, Kyoto (JP); Keisuke Yorioka, Osaka (JP); Manabu Kuroda, Hyogo (JP); Masakazu Kanda, Kyoto (JP)

(73) Assignee: Panasonic Corporation, Osaka (JP)

( * ) Notice: Subject to any disclaimer, the term of this patent is extended or adjusted under 35 U.S.C. 154(b) by 1513 days.

(21) Appl. No.: 11/516,055

(22) Filed: Sep. 6, 2006

(65) Prior Publication Data

US 2007/0058727 A1    Mar. 15, 2007

(30) Foreign Application Priority Data

Sep. 6, 2005   (JP) .................. 2005-257192

(51) Int. Cl.
*H04N 7/12*     (2006.01)
*H04N 11/02*    (2006.01)

(52) U.S. Cl. ............... 375/240.24; 375/240.13

(58) Field of Classification Search .......... 348/512, 348/501, 400.1, 406.1, 414.1, 417.1, 418.1, 348/419.1, 405.1, 448, 458, 459, 446; 382/232, 382/251, 239, 236; 375/240.16, 240.24, 375/240.13, 240.03, 240.02, 240.01, 245, 375/240.26
See application file for complete search history.

(56) References Cited

U.S. PATENT DOCUMENTS

| | | | |
|---|---|---|---|
| 5,828,411 | A | 10/1998 | Takizawa |
| 6,751,405 | B1 * | 6/2004 | Hasegawa ............ 386/329 |
| 2002/0118756 | A1 * | 8/2002 | Nakamura et al. ...... 375/240.17 |
| 2003/0154687 | A1 * | 8/2003 | Sugahara et al. ............. 52/750 |
| 2007/0014355 | A1 | 1/2007 | Tsukagoshi et al. |

FOREIGN PATENT DOCUMENTS

| | | |
|---|---|---|
| JP | 10-042295 | 2/1998 |
| JP | 2003-284072 | 10/2003 |
| JP | 2005-57750 A | 3/2005 |
| JP | 2005-080123 | 3/2005 |

OTHER PUBLICATIONS

Japanese Notice of Reasons for Rejections, w/ English translation thereof, issued in Japanese Patent Application No. JP 2005-257192 dated Jul. 13, 2010.

* cited by examiner

*Primary Examiner* — Behrooz Senfi
(74) *Attorney, Agent, or Firm* — McDermott Will & Emery LLP

(57) ABSTRACT

A coding section encodes plural pieces of video data sequentially. A measuring section measures a time period which the coding section has used for coding video data. When the time period measured by the measuring section is judged to be longer than a predetermined time based on a frame rate of the video data, a control section selects at least one piece of video data to be coded after the video data coded by the coding section out of the plural pieces of video data and generates a predetermined bit stream instead of coded data of the thus selected video data without allowing the coding section to encode the selected data.

10 Claims, 29 Drawing Sheets

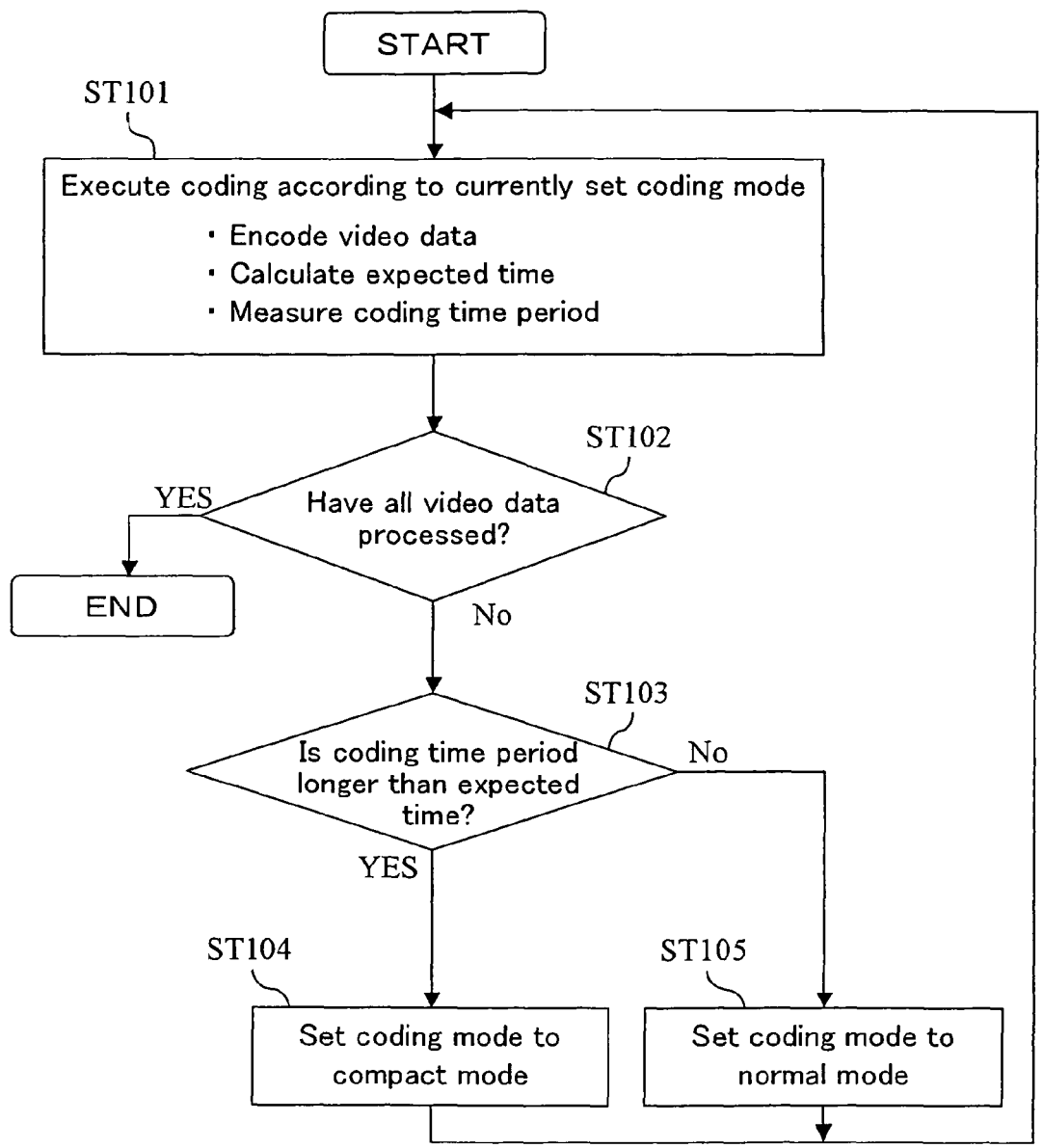

VIDEO CODER, CODING CONTROLLER, AND VIDEO CODING METHOD

FIELD OF THE INVENTION

The present invention relates to apparatus and method for coding video data, and particularly relates to a countermeasure for circumventing abnormality in the case where a video data coding time period overruns predetermined time.

BACKGROUND ART

Conventional video coders calculate a processing amount (an amount of coding processing) necessary for coding video data in coding the video data stored in a frame memory and perform processing for reducing the calculated processing amount. Specifically, the amount of coding processing is reduced by simplifying moving prediction below a slice layer or a macro block layer in forward reference image coding or bidirectional reference coding. Such processing reduces an amount of coding processing so that coding of video data is completed within time calculated based on a frame rate (see, for example, Japanese Patent Application Laid Open Publication No. 2005-57750A).

In the conventional video coders, however, because an amount of processing for coding video data is reduced prior to execution of the coding, new video data may be overwritten in the frame memory to cause image noise when a real coding time period overruns predetermined time (for example, time calculated based on a frame rate). When an amount of coding processing overflows, error notification is output to cause interruption of the processing, resulting in temporally discontinuous coding. Thus, the coding system may be broken.

SUMMARY OF THE INVENTION

According to one aspect of the present invention, a video coder for coding plural pieces of video data includes: a coding section for coding the plural pieces of video data sequentially; a measuring section for measuring a time period which the coding section has used for coding video data; and a control section for judging whether or not the time period measured by the measuring section is longer than a predetermined time based on a frame rate of the video data and for selecting, when the time period measured by the measuring section is judged to be longer than the predetermined time, at least one piece of video data to be coded after the video data coded by the coding section out of the plural pieces of video data, and for generating a predetermined bit stream instead of encoded data of the selected video data without allowing the coding section to encode the selected data.

In the above video coder, a scheme for coding video data to be coded thereafter is changed when a time period used for coding video data in the coding section is longer than the predetermined time, thereby reducing the coding time period in the coding section. This suppresses image noise caused due to overwriting of new video data in the frame memory and temporal discontinuity of the coding processing caused due to overflow of the amount of coding processing. Thus, coding can be continued.

Preferably, the plural pieces of video data include a to-be-referenced picture to be referenced for coding another piece of video data and a referencing picture to be subjected to inter-frame predictive coding by referencing the to-be-referenced picture, the video coder further includes a picture type judging section for judging a picture type of each of the plural pieces of video data, and the control section selects, when the time period measured by the measuring section is judge to be longer than the predetermined time, at least one piece of video data which is to be coded after the video data coded by the coding section and which is judged as a referencing picture by the picture type judging section out of the plural pieces of video data, and generates the predetermined bit stream instead of encoded data of the selected video data without allowing the coding section to encode the selected data.

In the above video coder, the referencing image rather than the to-be-referenced image is subjected to compact coding, so that significant degradation of image quality can be prevented.

Preferably, the coding section has a first coding scheme and a second coding scheme which requires coding time shorter than the first coding scheme, the control section compares the time period measured by the measuring section with a first predetermined time based on a frame rate of the video data and a second predetermined time shorter than the first predetermined time, selects, when the time period measured by the measuring section is judged to be longer than the first predetermined time, at least one piece of video data to be coded after the video data coded by the coding section out of the plural pieces of video data, and generates the predetermined bit stream instead of coding data of the selected video data without allowing the coding section to encode the selected data, and the control section selects, when the time period measured by the measuring section is judged not to be longer than the first predetermined time and to be longer than the second predetermined time, at least one piece of video data to be coded after the video data coded by the coding section out of the plural pieces of video data, and allows the coding section to encode the selected video data in accordance with the second coding scheme.

In the above video coder, the scheme for coding the video data to be coded thereafter is changed according to the extent of overrunning of the coding time period in the coding section. As a result, significant degradation of image quality and lowering of temporal continuity are suppressed, and overrunning of the coding time period is prevented.

Preferably, the plural pieces of video data include a to-be-referenced picture to be referenced for coding another piece of video data and a referencing picture to be subjected to inter-frame predictive coding by referencing the to-be-referenced picture, the video coder further includes: a picture type judging section for judging a picture type of each of the plural pieces of video data; and a reference time setting section for setting the first and second predetermined times to be compared with the time period measured by the measuring section to first and second reference times, respectively, according to a picture type judgment result by the picture type judging section, and the control section compares the time period measured by the measuring section with the first and second reference times set by the reference time setting section.

In the above video coder, the reference time for judging the extent of overrunning of the coding time period is changed according to the picture type of the video data to be coded thereafter. This further suppresses significant degradation of image quality and lowering of temporal continuity and prevents the coding time period from overrunning.

Preferably, the plural pieces of video data include a first to-be-referenced picture to be referenced for coding another piece of video data, a second to-be-referenced picture to be coded after the first to-be-referenced picture, a third to-be-referenced picture to be coded after the second to-be-referenced picture, a referencing picture which is present between the first to-be-referenced picture and the second to-be-referenced picture and is to be subjected to bidirectional inter-frame predictive coding by referencing the first and second to-be-referenced pictures, and another referencing picture which is present between the second to-be-referenced picture and the third to-be-referenced picture and is to be subjected to bidirectional inter-frame predictive coding by referencing the second and third to-be-referenced pictures, the video coder further includes a picture type judging section for judging a picture type of each of the plural pieces of video data, the measuring section measures a total time period of a time period which the coding section has used for coding video data judged as the first to-be-referenced picture by the picture type judging section and a time period which the coding section has used for coding video data present between the video data judged as the first to-be-referenced picture by the picture type judging section and video data judged as the second to-be-referenced picture by the picture type judging section, and when the total time period measured by the measuring section is judged to be longer than a predetermined total time based on a frame rate of the video data, the control section generates the predetermined bit stream instead of the video data judged as the second to-be-referenced picture by the picture type judging section without allowing the coding section to encode the video data judged as the second to-be-referenced picture by the picture type judging section and generates the predetermined bit stream instead of the video data without allowing the coding section to encode a referencing picture present between the video data judged as the second to-be-referenced picture by the picture type judging section and video data judged as the third to-be-referenced picture by the picture type judging section.

In the above video coder, the compact coding processing is executed using an aggregation of the to-be-referenced image and the referencing image as one unit, thereby realizing coding processing with temporal continuity maintained and degradation of image quality suppressed.

Preferably, the plural pieces of video data include a first to-be-referenced picture to be referenced for coding another picture, a second to-be-referenced picture to be coded after the first to-be-referenced picture, and a referencing picture which is present between the first to-be-referenced picture and the second to-be-referenced picture and is to be subjected to inter-frame predictive coding by referencing the first and second to-be-referenced pictures, the video coder further includes a picture type judging section for judging a picture type of each of the plural pieces of video data, the coding section further has a first predictive coding scheme and a second predictive coding scheme, the coding section performing bidirectional inter-frame predictive coding on the referencing picture present between the first and second to-be-referenced pictures by referencing the first and second to-be-referenced pictures in the first predictive coding and performing inter-frame predictive coding on the referencing picture present between the first and second to-be-referenced pictures by referencing one of the first and second to-be-referenced pictures for which the predetermined bit steam is not generated without performing bidirectional inter-frame predictive coding thereon in the second predictive coding, and the control section changes the coding scheme of the coding section to the second predictive coding scheme when the predetermined bit stream is generated instead of coding of the video data judged as first or second to-be-referenced picture by the picture type judging section.

In the above video coder, the video data is coded without referencing the video data for which the compact coding processing has been executed, reducing pictures which might cause image noise.

Preferably, the plural pieces of video data further include a third to-be-referenced picture to be coded after the second to-be-referenced picture and another referencing picture which is present between the second to-be-referenced picture and the third to-be-referenced picture and is to be subjected to inter-frame predictive coding by referencing the second and third to-be-referenced pictures, the coding section performs bidirectional predictive coding on a referencing picture present between the first to-be-referenced picture and the second to-be-referenced picture by referencing the first and second to-be-referenced pictures or performs bidirectional predictive coding on a referencing picture present between the second to-be-referenced picture and the third to-be-referenced picture by referencing the second and third to-be-referenced pictures in the first predictive coding scheme, and the coding section performs inter-frame predictive coding on a referencing picture present between the first to-be-referenced picture and the second to-be-referenced picture by referencing the second to-be-referenced picture without performing bidirectional inter-frame predictive coding thereon or performs inter-frame predictive coding on a referencing picture present between the second to-be-referenced picture and the third to-be-referenced picture by referencing the third to-be-referenced picture without performing bidirectional inter-frame predictive coding thereon in the second predictive coding scheme, and the control section changes the coding scheme of the coding section to the second predictive coding scheme when the predetermined bit stream is generated instead of coding of video data judged as the second to-be-referenced picture by the picture type judging section.

Preferably, the predetermined bit stream is a copy stream of the video data that has been already coded in the coding section.

Preferably, the video coder further includes: a frame memory for storing the plural pieces of video data sequentially; and a buffer memory for storing video data coded by the coding section, wherein the coding section encodes video data stored in the frame memory, and the control section selects, when the time period measured by the measuring section is judged to be longer than the predetermined time, at least one piece of video data to be coded after the video data coded by the coding section out of the video data stored in the frame memory, deletes the selected video data from the frame memory, generates the predetermined bit stream instead of coded data of the deleted video data, and stores the generated predetermined bit stream into the buffer memory.

In the above video coder, deletion of the video data enables the frame memory to store another piece of video data newly. This leads to continuous coding with no additional memory used.

According to another aspect of the present invention, a video coder for coding plural pieces of video data, includes: a coding section having a first coding scheme and a second coding scheme which requires time for coding sorter than the first coding scheme, the coding section being for sequentially coding the plural pieces of video data in accordance with either one of the first and second coding schemes; a measuring section for measuring a time period which the coding section has used for coding video data; and a control section for judging whether or not the time period measured by the measuring section is longer than a predetermined time based on a frame rate of the video data, for selecting, when the time period measured by the measuring section is judged to be longer than the predetermined time, at least one piece of video data to be coded after the video data coded by the coding section out of the plural pieces of video data, and for allowing the coding section to encode the selected video data in accordance with the second coding scheme.

In the above video coder, when the time period which has been used for coding the video data in the coding section is longer than the predetermined time, the scheme for coding the video data to be coded thereafter is changed, so that the coding time period that the coding section requires can be reduced. This suppresses image noise caused due to overwriting of new video data in the frame memory and temporal discontinuity of the coding processing caused due to overflow of the amount of coding processing. Thus, coding can be continued.

Preferably, the measuring section further measures a partial coding time period which the coding section has used for coding a predetermined amount of data of video data, and in the time when the coding section encodes video data in accordance with the second coding scheme, the control section judges whether or not the partial time period measured by the measuring section is longer than a predetermined partial time based on a frame rate of the video data and allows, when the partial time period measured by the measuring section is judged not to be longer than the predetermined partial time, the coding section to encode an uncoded part of the video data being subjected to coding by the coding section in accordance with the first coding scheme.

In the above video coder, whether or not the coding time period is longer than the expected time every time when coding of a part of the video data is completed, so that the processing returns to the normal coding processing before completion of coding of the video data for one picture. This prevents excessive shortening of the coding time period and suppresses degradation of image quality and the like.

According to another aspect of the present invention, a coding controller for controlling a video coder which encodes plural pieces of video data sequentially, the coding controller includes: a measuring section for measuring a time period which the video coder has used for coding video data; and a control section for judging whether or not the time period measured by the measuring section is longer than a predetermined time based on a frame rate of the video data, for selecting, when the time period measured by the measuring section is Judged to be longer than the predetermined time, at least one piece of video data to be coded after the video data coded by the video coder out of the plural pieces of video data, and for generating a predetermined bit stream instead of coded data of the selected video data without allowing the video coder to encode the selected video data.

According to still another aspect of the present invention, there is provided a coding controller for controlling a video coder which has a first coding scheme and a second coding scheme requiring a coding time period shorter than the first coding scheme and which encodes plural pieces of video data sequentially in accordance with either one of the first and second coding modes, the coding controller including: a measuring section for measuring a time period which the video coder has use for coding video data; and a control section for judging whether or not the time period measured by the measuring section is longer than a predetermined time based on a frame rate of the video data, for selecting, when the time period measured by the measuring section is judged to be longer than the predetermined time, at least one piece of video data to be coded after the video data coded by the video coder out of the plural pieces of video data, and for allowing the video coder to encode the selected video data in accordance with the second coding scheme.

BRIEF DESCRIPTION OF THE DRAWINGS

FIG. 3 is a flowchart for depicting an operation of the video coder shown in FIG. 1.

DESCRIPTION OF THE PREFERRED EMBODIMENTS

Figure 1:
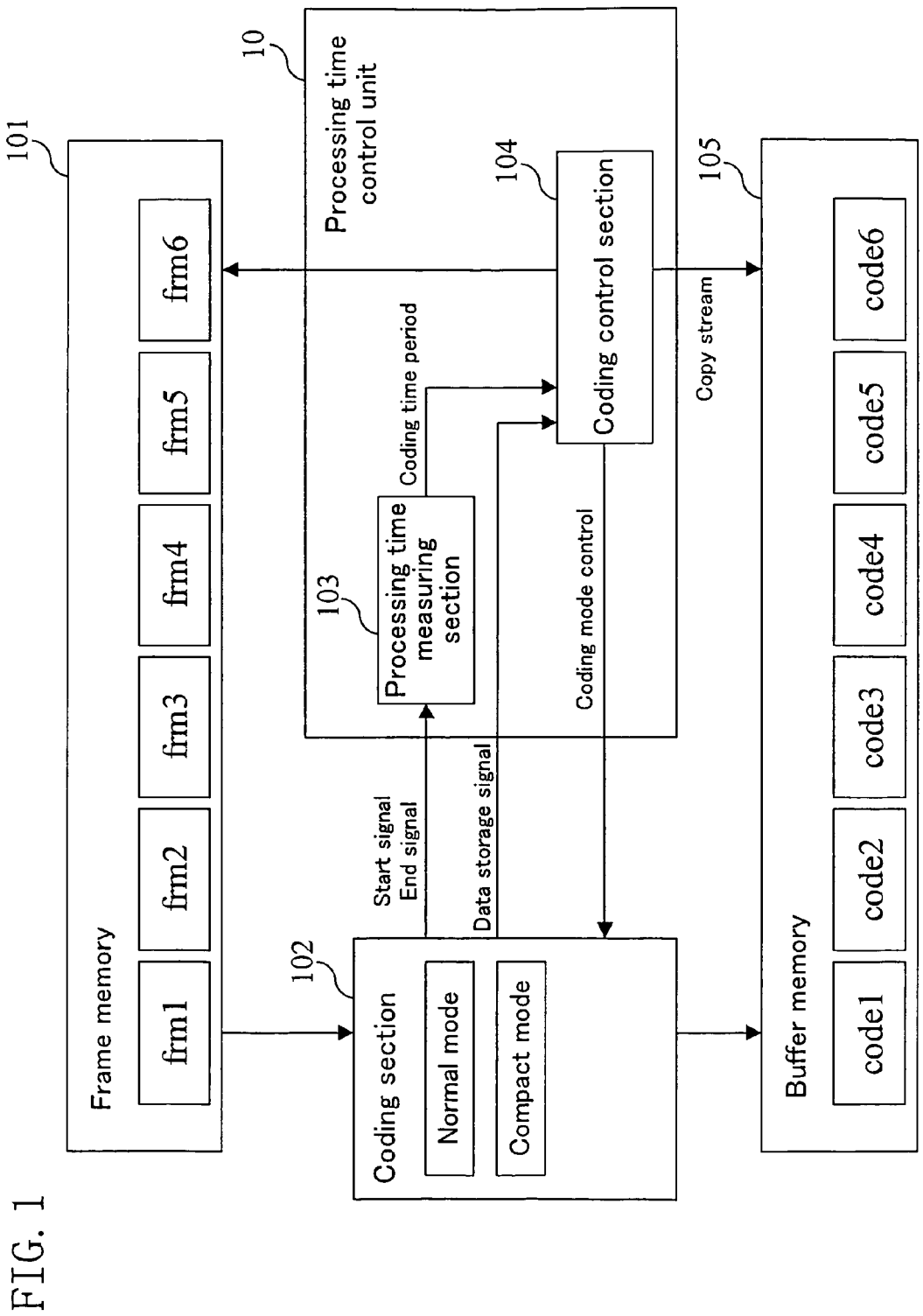
FIG. 1 is a block diagram showing an entire construction of a video coder according to Embodiment 1 of the present invention.

Embodiments of the present invention will be described below in detail with reference to the drawings. Wherein, the same reference numerals are assigned to the same or corresponding elements in the drawings, and the description thereof is not repeated.

Embodiment 1

(Entire construction)

FIG. 1 shows an entire construction of a video coder according to Embodiment 1 of the present invention. The video coder includes a frame memory 101, a coding section 102, a processing time control unit 10, and a buffer memory 101.

The frame memory 101 stores video data from outside on a frame unit (picture unit) basis sequentially. Herein, the frame memory 101 stores six pieces of video data Frm1 to frm6.

The coding section 102 has two coding modes of a normal mode and a compact mode to be set by the coding control section 104 to either mode. When the coding mode is set to the normal mode, the coding section 102 encodes video data to be coded next in accordance with a normal mode coding scheme. In contrast, when the coding mode is set to the compact mode, the coding section 102 does not perform coding of the video data to be coded next. To the processing time control unit 10, the coding section 102 outputs a data storage signal when starting loading video data for one picture, outputs a start signal when starting coding the loaded video data, and outputs an end signal when completing coding of the video data for one picture.

The processing time control unit 10 controls the frame memory 101, the coding section 102, and the buffer memory 105 according to a time period (a coding time period) that the coding section 102 has used for coding video data. The processing time control unit 10 includes a processing time measuring section 03 and a coding control section 104. The processing time measuring section 103 measures a coding time period with the use of the end signal output from the coding section 102. For example, the processing time measuring section 103 measures a time period from receipt of the start signal to receipt of the end signal from the coding section 102. The coding control section 104 calculates, on the basis of a frame rate of video data, time (expected time) that can be used for coding. For example, upon receipt of the data storage signal from the coding section 102, the coding control section 104 obtains, on the basis of a frame rate, time at which the coding section 102 must complete coding of the video data, and calculates a time period from the time when the data storage signal is received from the coding section 102 to the thus obtained time. Further, the coding control section 104 has two coding modes of a normal mode and a compact mode. The coding control section 104 compares a coding time period measured by the processing time measuring section 103 with the calculated expected time and changes the coding mode of the coding section 102 and the coding mode of its own according to the comparison result. In the compact mode, the coding control section 104 deletes video data which the coding section 102 is to encode next from the from memory 101 and stores a copy stream instead of coded data of the deleted video data into the buffer memory 105. The copy stream is a codeword bit stream indicating that it is the same as the previously coded video data.

The buffer memory 105 stores sequentially video data (coded video data) coded by the coding section 102. Herein, the buffer memory 105 stores six pieces of coded video data code1 to code6.

(Normal Coding Processing)

Description will be given here with reference to FIG. 2A to processing of the coding section 102 and the coding control section 104 shown in FIG. 1 in the normal mode.

<Step ST101-11>

When the coding mode is set to the normal mode, the coding section 102 selects video data to be coded next from the frame memory 101 and loads the selected video data. At that time, the coding section 102 outputs a data storage signal. Upon receipt of the data storage signal from the coding section 102, the coding control section 104 calculates, based on the frame rate of the video data, time (expected time) that can be used for coding the video data.

<Step ST101-12>

Next, the coding section 102 encodes the loaded video data in accordance with a normal mode coding scheme to generate coded video data.

<Step ST101-13>

Upon receipt of a start signal and an end signal from the coding section 102, the processing time measuring section 103 measures a time period (a coding time period) that the coding section 102 has used for coding the video data.

<Step ST101-14>

Subsequently, the coding section 102 stores into the buffer memory 105 the coded video data generated in the step ST101-12.

(Compact Coding Processing)

Next, description will be given with reference to FIG. 2B to processing of the coding section 102 and the coding control section 104 shown in FIG. 1 in the compact mode.

<Step ST101-21>

When the coding mode is set to the compact mode, the coding section 102 does not perform coding of video data to be coded next. The coding control section 104 selects video data to be coded by the coding section 102 from the frame memory 101 and deletes the selected video data. This empties a region of video data for one picture in the frame memory 101. As a result, the frame memory 101 is ready to store another piece of video data in place of the deleted video data.

<Step ST101-22>

The coding control section 104 calculates expected time on the basis of the frame rate of the video data.

<Step ST101-23>

Next, the coding control section 104 detects the previously generated coded video data in the buffer memory 105. The coding control section 104 generates a copy stream of the coded video data detected from the buffer memory 105.

<Step ST101-24>

Further, the coding control section 104 measures a time period which has been used for generating the copy stream as a coding time period.

<ST Step ST101-25>

Subsequently, the coding control section 104 stores into the buffer memory 105 the copy stream generated in the step ST101-23. Thus, the bit stream instead of coded data of the video data not coded by the coding section 102 is stored in the buffer memory 105.

(Operation)

An operation of the video coder shown in FIG. 1 will be described next with reference to FIG. 3.

<Step ST101>

First, the coding section 102 and the coding control section 104 execute the coding processing (the normal coding processing or the compact coding processing) according to the currently set coding mode.

<Step ST102>

Next, if all video data stored in the frame memory 101 have been coded, the processing terminates. Otherwise, the routine proceeds to a step ST103.

<Step ST103>

Subsequently, the coding control section 104 judges whether or not the coding time period measured by the processing time measuring section 103 in the step ST101 is longer than the expected time period calculated in the step ST101. If the coding time period is longer than the expected time, the routine proceeds to a step ST104. Otherwise, it proceeds to a step ST105.

<Step ST104>

Then, the coding control section 104 sets the coding mode of its own and the coding mode of the coding section 102 to "the compact mode." The routine then returns to the step ST101.

<Step ST105>

On the other hand, if the coding time period is not longer than the expected time in the step ST103, the coding control section 104 sets the coding mode of its own and the coding mode of the coding section 102 to "the normal mode." The routine then returns to the step ST101.

Specific Example

Figure 4:
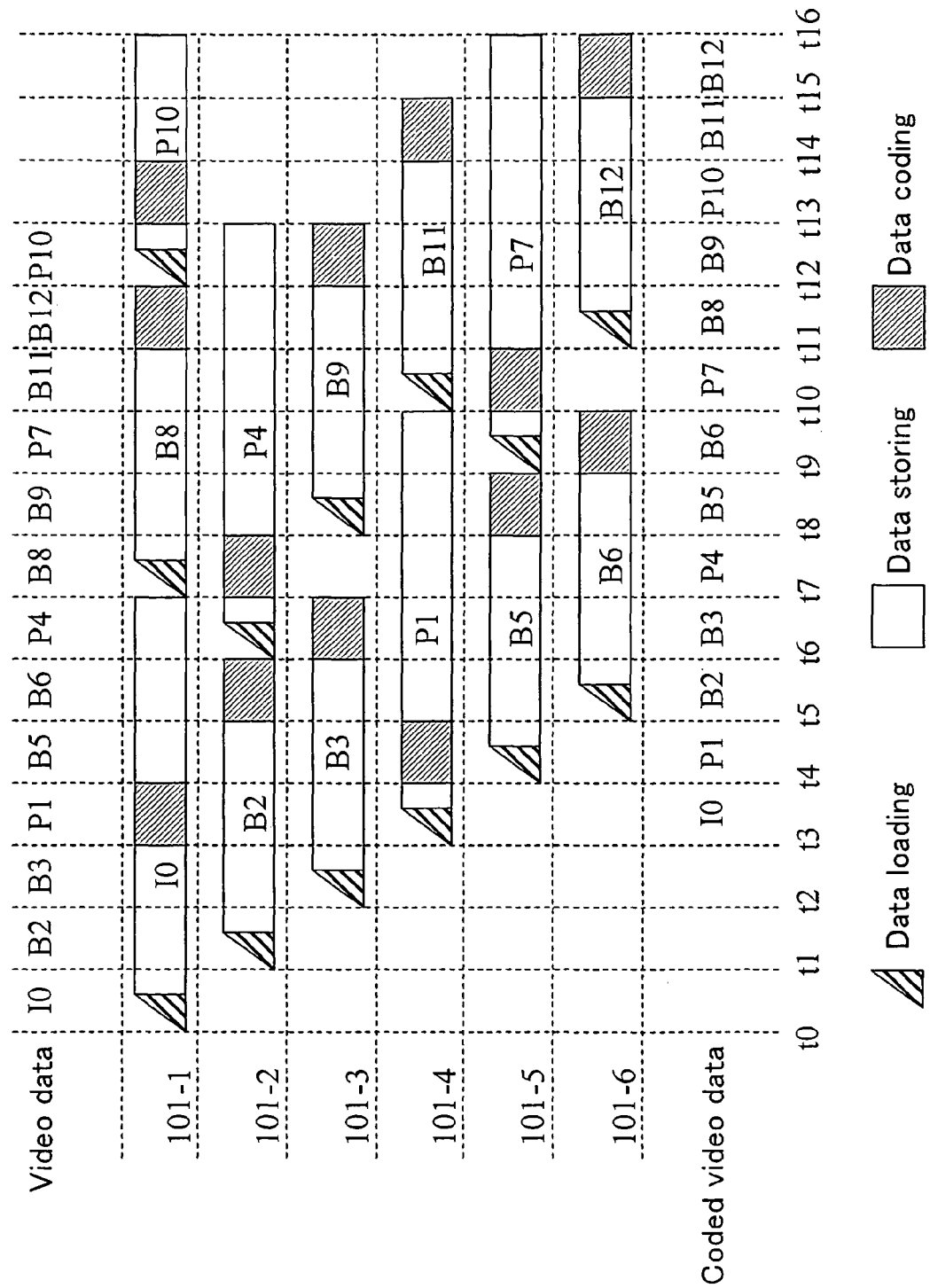
FIG. 4 is a timing chart for depicting the normal coding processing.
Figure 5:
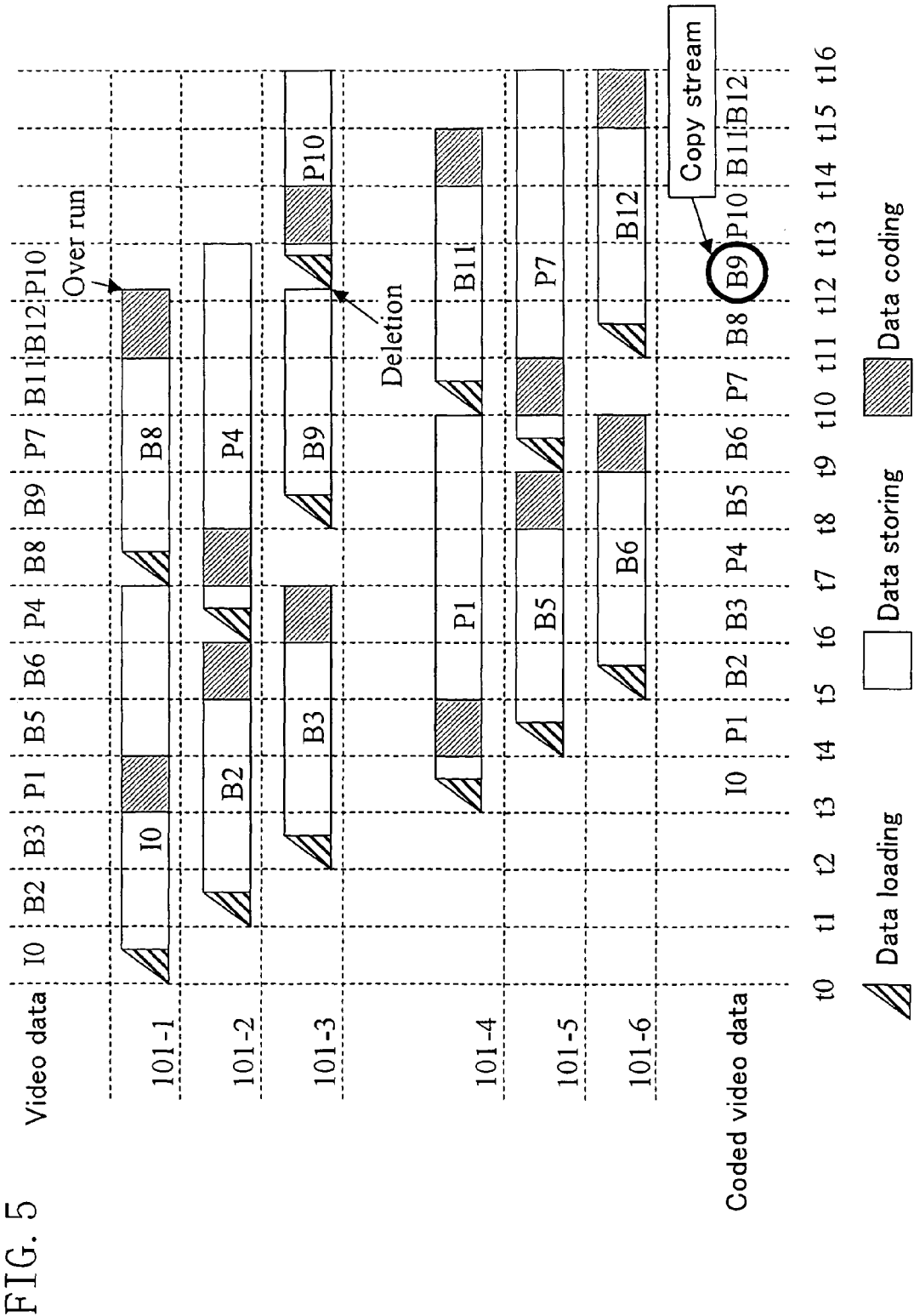
FIG. 5 is a timing chart for depicting the compact coding processing.

Detailed description will be give here to the compact coding processing shown in FIG. 3 with reference to FIG. 4 and FIG. 5. Herein, video data I0, B2, B3, P1, B5, B6, P4, ..., P10 are input in this order to the video coder. In the drawings, "I," "P," and "B" mean I-picture, P-picture, and B-picture, respectively.

(Normal Coding)

First, description will be given with reference to FIG. 4 to the case where no overrun occurs in the coding processing by the coding section 102. Herein, the frame memory 101 includes six frame memories 101-1 to 101-6, and the currently set coding mode is "the normal mode."

At time t0, the frame memory 101-1 starts loading the video data I0. When completing loading of the video data I0, the frame memory 101-1 holds the video data I0.

At time t1, the frame memory 101-2 starts loading the video data B2. When completing loading of the video data B2, the frame memory 101-2 holds the video data B2.

At time t2, the frame memory 101-3 starts loading the video data B3. When completing loading of the video data B3, the frame memory 101-3 holds the video data B3.

At time t3, the coding section 102 starts coding the video data I0 stored in the frame memory 101-1. The frame memory 101-4 starts loading the video data P1. When completing loading of the video data P1, the frame memory 101-4 holds the video data P1.

At time t4, the coding section 102 completes coding of the video data I0. The processing time measuring section 103 measures a coding time period in response to receipt of a start signal and an end signal from the coding section 102. When the coding control section 104 judges that the coding time period is not longer than the expected time, the coding control section 104 does not change the coding mode of the coding section 102 and the coding mode of its own. Accordingly, the coding section 102 starts coding the video data P1 stored in the frame memory 101-4 by referencing the video data I0 stored in the frame memory 101-1. While, the frame memory 101-5 starts loading the video data B5.

At time t5, the coding section 102 completes coding of the video data P1. In this case, the coding time period is not longer than the expected time, and accordingly, the coding section 102 starts coding the video data B2 stored in the memory frame 101-2 by referencing the video data I0, P1 respectively stored in the frame memories 101-1, 101-4. While, the frame memory 101-6 starts loading the video data B6.

At time t6, the coding section 102 completes coding of the video data B2. The frame memory 101-2 abandons the stored video data B2 and starts loading the video data P4. Further, the coding section 102 starts coding the video data B3 stored in the frame memory 101-3 by referencing the video data I0, P1 respectively stored in the frame memories 101-1, 101-4.

At time t7, the coding section 102 completes coding of the video data B3. The frame memory 101-3 abandons the stored video data B3. The frame memory 101-1 abandons the stored video data I0 and starts loading the video data B8.

At time t8 and following times, the same series of processing in the times t1 to t7 is repeated.

Execution of the above described a series of processing allows the buffer memory 105 to store sequentially the coded video data I0, P1, ..., B12 in this order.

(Compact Coding Processing)

Next, description will be given with reference to FIG. 5 to the case where the compact coding processing is executed upon occurrence of overrun in the coding processing.

In time t0 to time t12, no overrun occurs in the coding processing, and therefore, the same processing as that in the normal mode is executed.

Suppose that overrun in coding the video data B8 by the coding section 102 occurs between time t12 and time t13. The coding control section 104 judges that the coding time period is longer than the expected time. The coding control section 104 sets the coding mode of the coding section 102 and the coding mode of its own to "the compact mode." Then, the coding control section 104 abandons the video data B9 (video data to be coded next) stored in the frame memory 101-3. The frame memory 101-3 stops loading the video data B9 and starts loading the video data P10. When coding of the video data B8 is completed, the coding section 102 stores into the buffer memory 105 the thus generated coded video data B8 is completed. On the other hand, the coding control section 104 generates a copy stream of the coded video data B8 (previously generated coded video data) stored in the buffer memory 105 and stores into the buffer memory 105 the thus generated copy stream as coded data of the video data B9. Subsequently, the coding control section 104 sets the coding mode of the coding section 102 and the coding mode of its own to "the normal mode."

At time t13, the coding section 102 starts coding the video data P10 stored in the frame memory 101-3 rather than the frame memory 101-1.

Execution of the above described series of processing allows the buffer memory 105 to store the coded video data I0, P1, B2, ..., B8 in this order as shown in FIG. 5, store the copy stream as the coded video data B9, and then, store the coded video data P10, B11, B12 in this order.

(Effects)

As described above, the scheme for coding video data to be coded next is changed when the coding time period is longer than the expected time so that time for coding video data to be coded next is reduced. This suppresses image noise caused due to overwriting of new video data in a frame memory and temporal discontinuity of the coding processing caused due to overflow of the amount of the coding processing. Hence, coding can be performed continuously.

Further, a copy stream is stored into the buffer memory as coded video data upon occurrence of overrun in video data coding, thereby reducing a burden on the coding section to eliminate influence of overflow over a plurality of frames.

In addition, deletion of video data enables the frame memory to store another piece of video data newly. This leads to continuous coding processing with no extra memory used.

In the present embodiment, the coding control section selects, as a target for compact coding processing, video data to be coded next by the coding section. The target for compact coding processing, however, may be any one of video data to be coded later than the video data of which coding time period is longer than the expected time. The number of pieces of video data to be subjected to the compact coding processing is not limited to only one and may be plural.

Modified Example of Embodiment 1

(Entire Construction)

Figure 6:
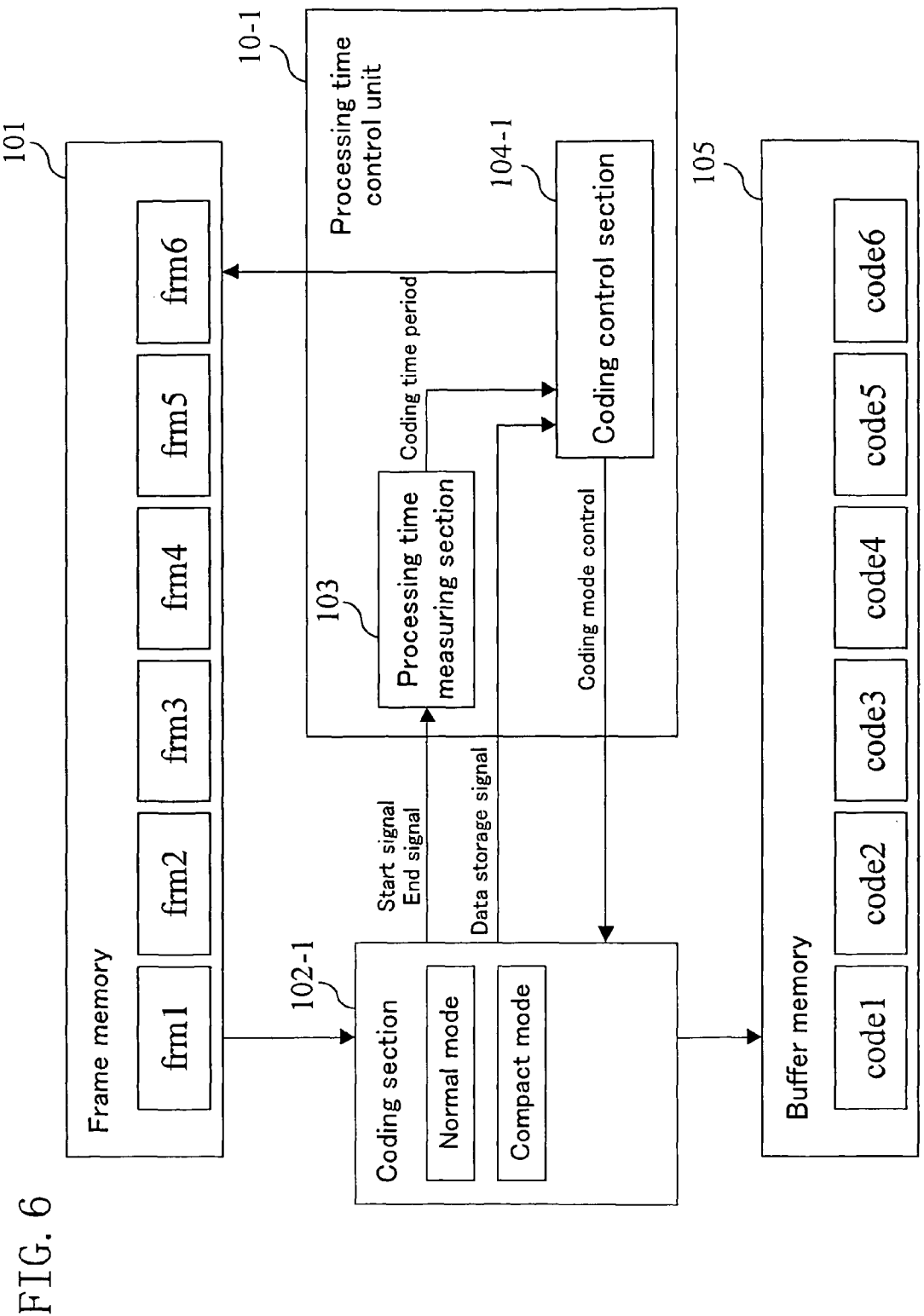
FIG. 6 is a block diagram showing a modified example of the video coder according to Embodiment 1 of the present invention.

FIG. 6 shows a video coder according to a modified example of Embodiment 1 of the present invention. This apparatus includes a coding section 102-1 and a processing time control unit 10-1 in lieu to the coding section 102 and the processing time control unit 10 shown in FIG. 1. The other elements are the same as those in FIG. 1. The processing time control unit 10-1 includes the processing time measuring section 103 shown in FIG. 1 and a coding control section 104-1.

The coding section 102-1 executes the same operation as the coding section 102 shown in FIG. 1 in the normal mode and executes a different operation in the compact mode. When the coding mode is set to the compact mode, the coding section 102-1 encodes video data to be coded next in accordance with a compact mode coding scheme. The compact mode coding scheme requires a coding time period shorter than the normal mode coding scheme. For example, the coding section 102-1 set in the compact mode executes retrieval of a motion vector in a narrowed range, executes forward or backward reference by referencing only a preceding image or a succeeding image rather than bidirectional reference, or executes intra-coding rather than inter-frame predictive coding.

The coding control section 104-1 calculates, on the basis of the frame rate of video data, time (expected time) that can be used for coding the video data. Further, the coding control section 104-1 compares the coding time period measured by the processing time measuring section 103 with the thus calculated expected time and changes the coding mode of its own and the coding mode of the coding section 102-1 according to the comparison result.

(Operation)

An operation of the video coder shown in FIG. 6 will be described next. The operation of this apparatus is the same as the operation (see FIG. 3) of the video coder shown in FIG. 1, wherein the compact coding processing is different therefrom (FIG. 2B).

(Compact Coding Processing)

Figure 7:
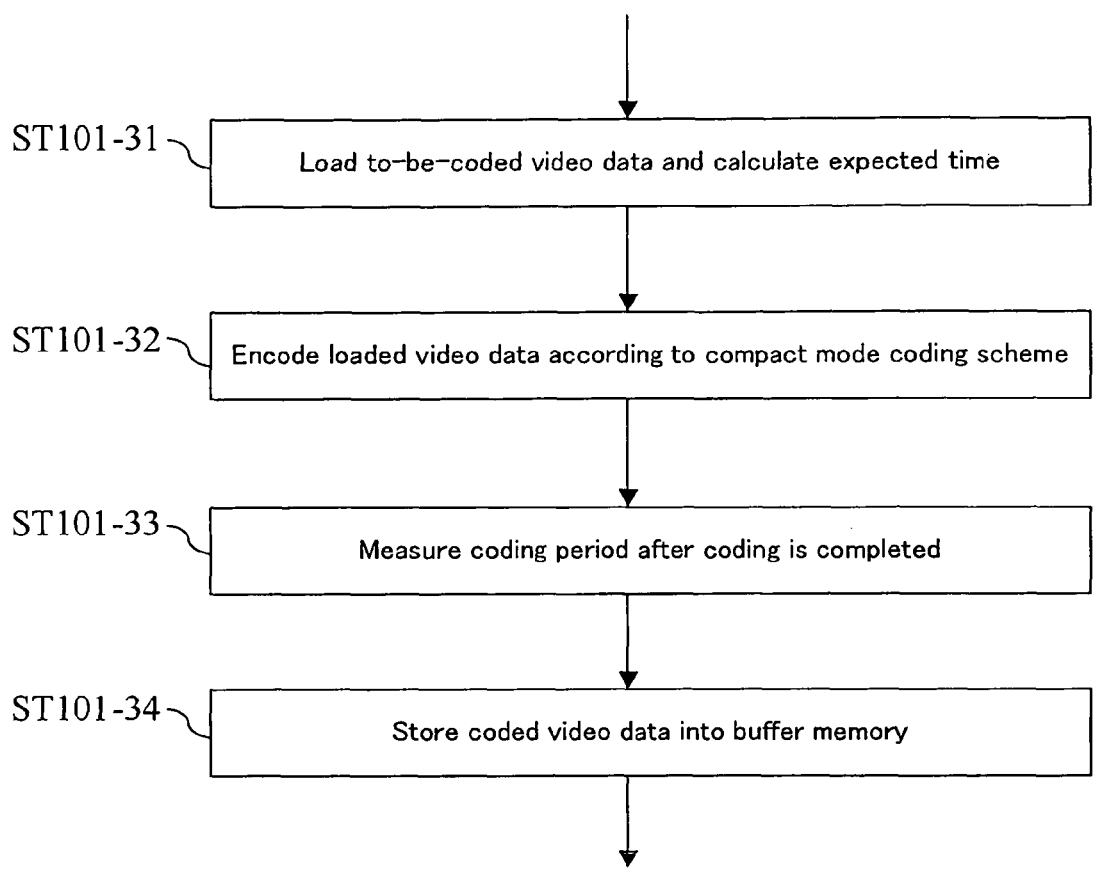
FIG. 7 is a flowchart for depicting an operation (compact coding processing) of the video coder shown in FIG. 6.

Description will be given with reference to FIG. 7 to processing of the coding section 102-1 and the coding control section 104-1 in the compact mode.

<Step ST101-31>

When the coding mode is set to the compact mode, the coding section 102-1 selects video data to be coded from the frame memory 101 and loads the selected video data. At the loading, the coding section 102-1 outputs a data storage signal. Upon receipt of the data storage signal from the coding section 102-1, the coding control section 104-1 calculates, on the basis of the frame rate of the video data, time (expected time) that can be used for coding the video data.

<Step ST101-32>

Next, the coding section 102 encodes the thus loaded video data in accordance with the compact mode coding scheme. Thus, coded video data is generated.

<Steps ST101-33 and ST101-34>

Figure 2A:
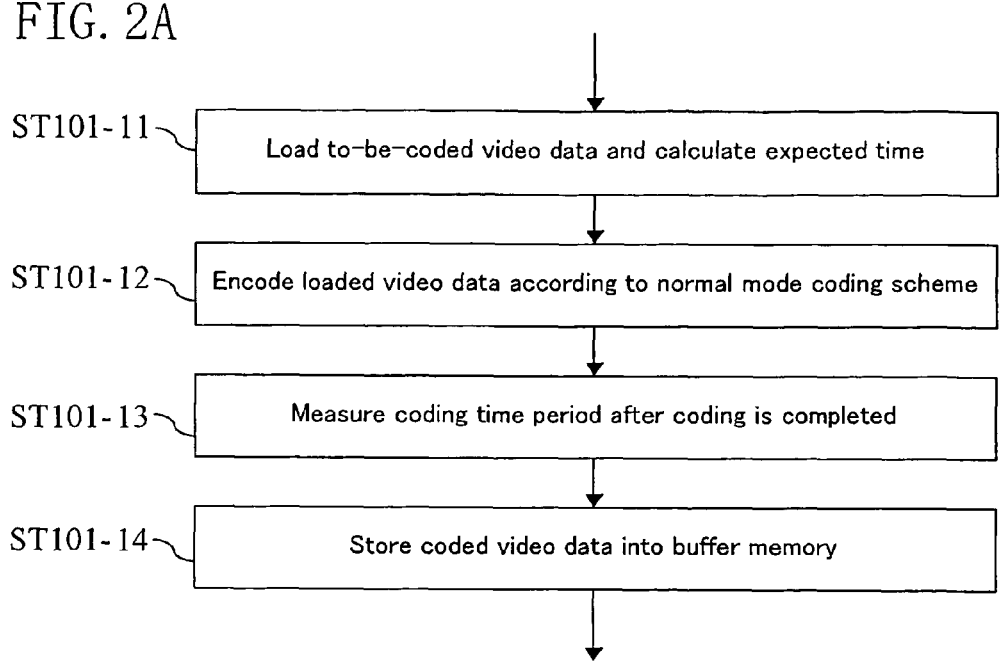
FIG. 2A is a flowchart for depicting normal coding processing.

Subsequently, the same series of processing as that in the step ST101-13 and ST101-14 shown in FIG. 2A is executed, so that the coded video data generated in accordance with the compact mode coding scheme is stored into the buffer memory 105.

Specific Example

Figure 8:
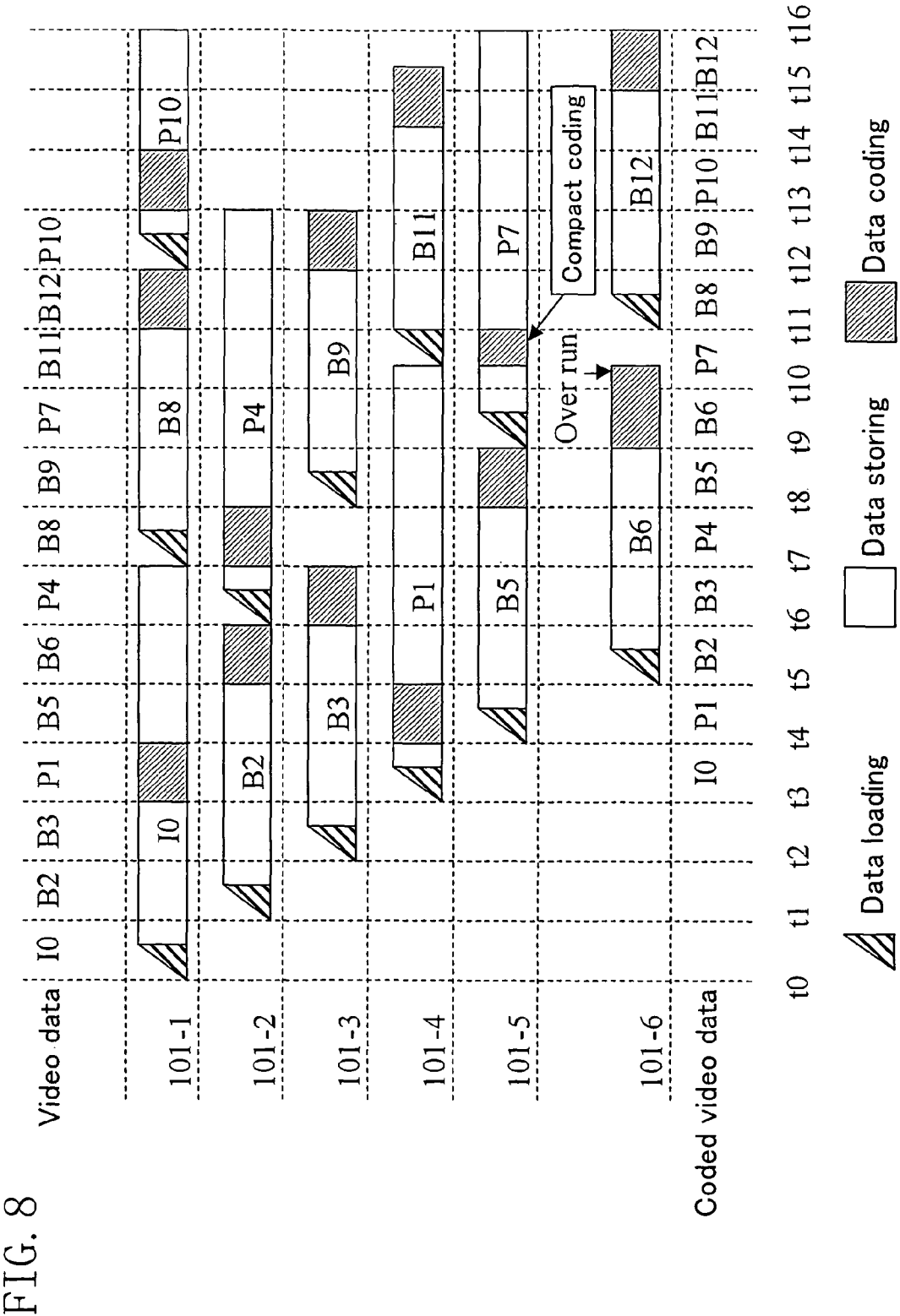
FIG. 8 is a timing charge for depicting the compact coding processing shown in FIG. 7.

Description will be given next with reference to FIG. 8 to the case where the compact coding processing is executed upon occurrence of overrun in the coding processing.

From time t0 to time t10, no overrun occurs in video data coding, and therefore, the same processing as the normal coding processing shown in FIG. 4 is executed.

When overrun occurs in coding the video data B6 by the coding section 102-1 between time t10 and time t11, the coding control section 104-1 judges that the coding time period measured by the processing time measuring section 103 is longer than the expected time. According to the judgment, the coding control section 104-1 changes the coding mode of the coding section 102-1 to "the compact mode." When the coding section 102-1 completes coding of the video data B6, the coding section 102-1 changes the coding scheme to the compact mode coding scheme. The coding section 102-1 then starts coding the video data P7 stored in the frame memory 101-5 in accordance with the thus changed compact mode coding scheme.

Next, at time t11, the coding section 102-1 completes coding of the video data P7. When the coding section 102-1 completes coding of the video data P7, the coding control section 104-1 sets the coding scheme of the coding section 102-1 to "the normal mode." The coding section 102-1 starts coding the video data B8 stored in the frame memory 101-1 in accordance with the thus set normal mode coding scheme.

Execution of the above described series of processing allows the buffer memory 105 to store the coded video data I0, P1, B2. . . , B6 in this order, store the coded video data P7 generated in the compact mode, and then, store the coded video data B8, B9, . . . , B12 in this order.

(Effects)

As described above, when the coding mode is changed to the compact mode shorter than the normal mode in time period required for coding upon occurrence of overrun in video data coding, a burden on the coding section is reduced. This suppresses image noise and system breakdown and attains continuous coding processing.

Embodiment 2

(Entire Construction)

Figure 9:
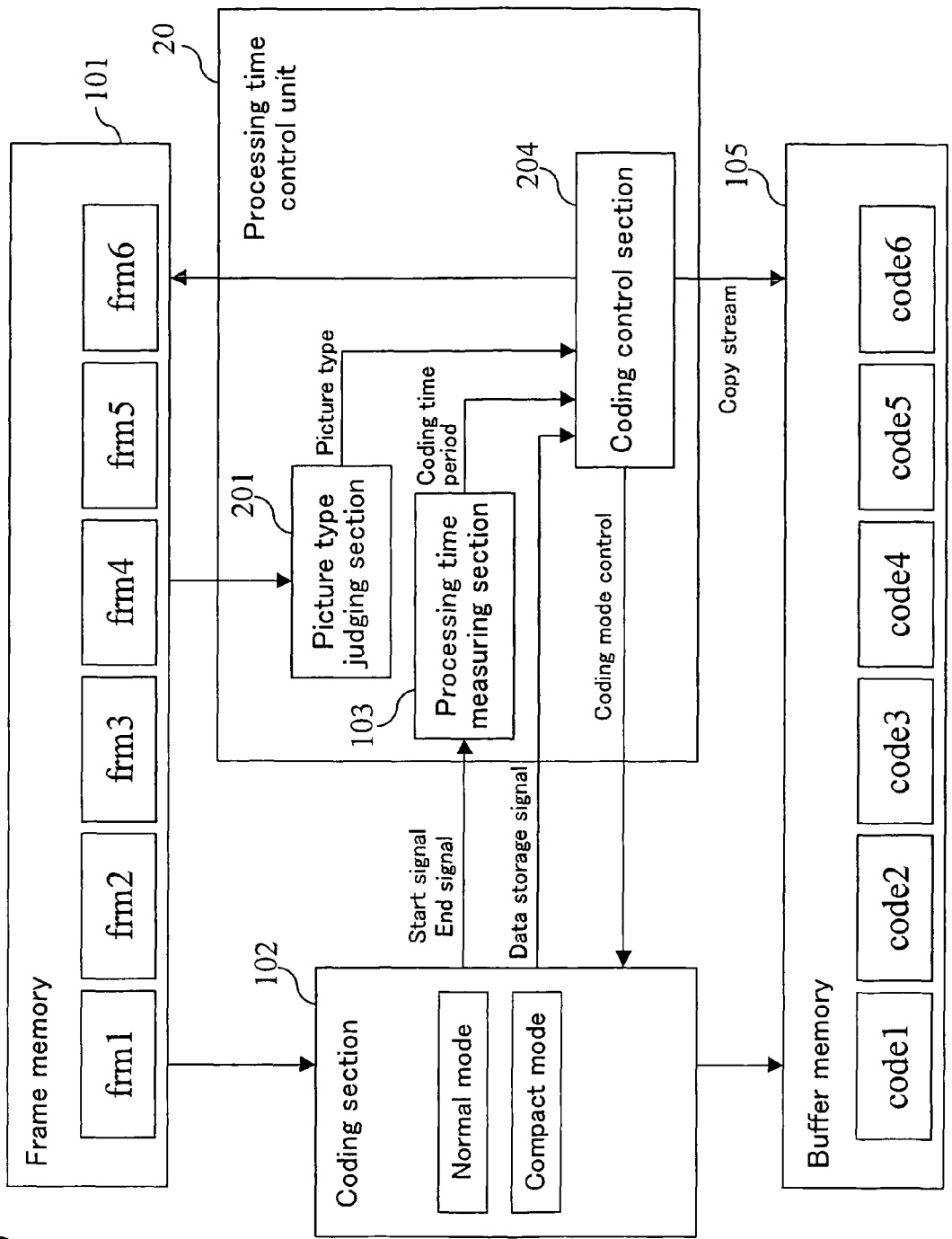
FIG. 9 is a block diagram showing an entire construction of a video coder according to Embodiment 2 of the present invention.

FIG. 9 shows an entire construction of a video coder according to Embodiment 2 of the present invention. This apparatus includes a processing time control unit 20 in lieu to the processing time control unit 10 shown in FIG. 1. The other elements are the same as those in FIG. 1. The processing time control unit 20 includes a picture type judging section 201, a coding control section 204, and the processing time measuring section 103 shown in FIG. 1.

The picture type judging section 201 judges a picture type of video data stored in the frame memory 101. Specifically, the picture type judging section 201 judges which type of "I-picture," "P-picture," and "B-picture" video data is.

The coding control section 204 executes the same operation as the coding control section 104, wherein it controls differently the coding mode of the coding section 102 and the coding mode of its own. The coding control section 204 changes the coding mode of the coding section 102 and the coding mode of its own according to the judgment result of the picture type judging section 201 and the measurement result of a coding time period by the processing time measuring section 103.

(Operation)

Figure 10:
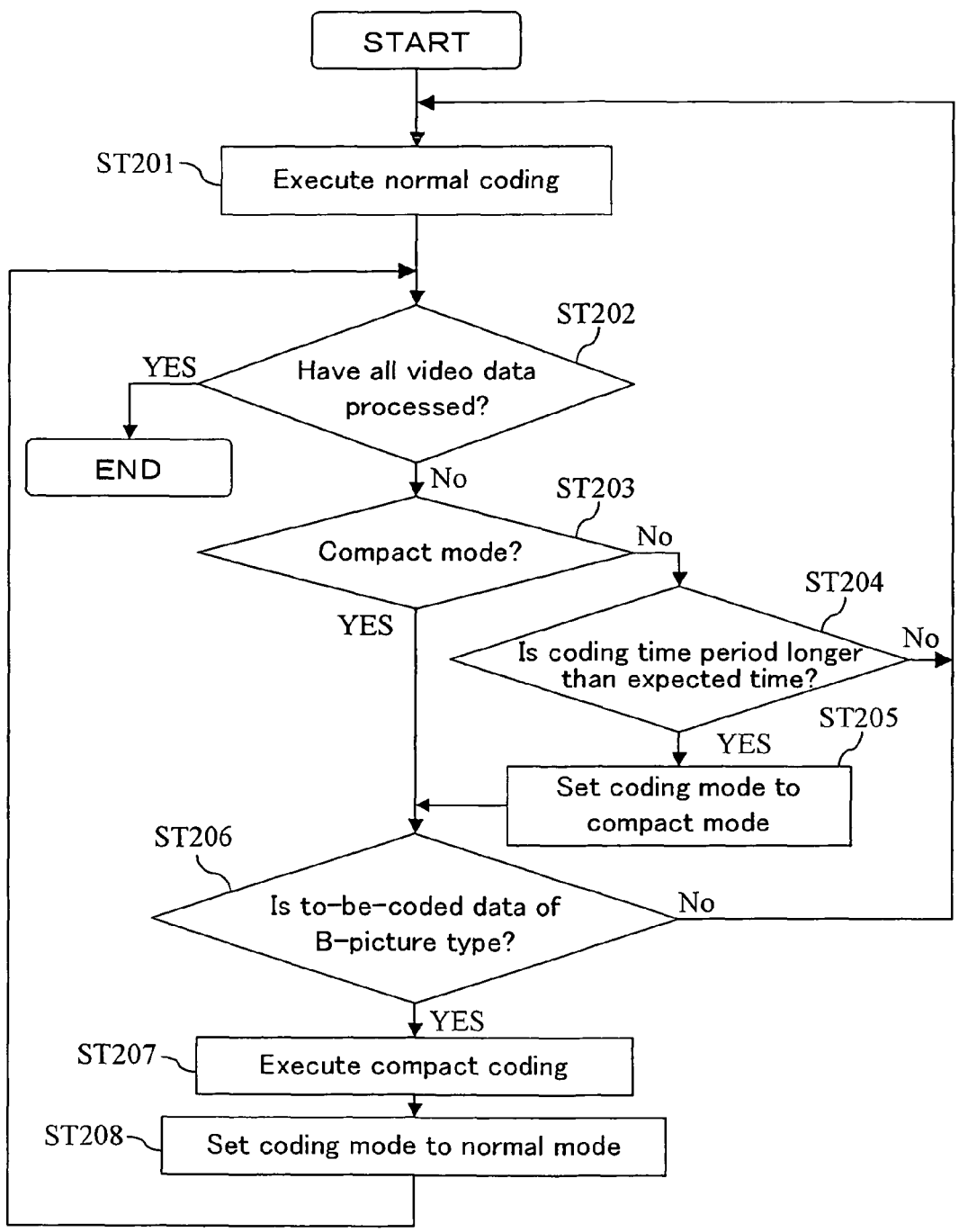
FIG. 10 is a flowchart for depicting an operation of the video coder shown in FIG. 9.

An operation of the video coder shown in FIG. 9 will be described next with reference to FIG. 10. Herein, each coding mode of the coding section 102 and the coding control section 204 is set to "the normal mode."

<Step ST201>

First, the normal coding processing (FIG. 2A) is executed.

<Step ST202>

If all video data stored in the frame memory 101 have been coded, the processing terminates. Otherwise, the routine proceeds to a step ST203.

<Step ST203>

Next, the coding control section 204 judges whether or not the coding mode of the coding section 102 and the coding mode of its own are set to "the compact mode." If each coding mode is set to "the compact mode," the routine proceeds to a step ST206. Otherwise, the routine proceeds to a step ST204.

<Step ST204>

Subsequently, the coding control section 204 judges whether or not the coding time period measured by the processing time measuring section 103 in the step ST201 is longer than the expected time calculated in the step ST201. If the coding time period is longer than the expected time, the routine proceeds to a step ST205. Otherwise, the routine returns to the step ST201.

<Step ST205>

Then, the coding control section 204 sets the coding mode of the coding section 102 and the coding mode of its own to "the compact mode." The routine then proceeds to the step ST206.

<Step ST206>

The picture type judging section 201 judges a picture type of video data to be coded next by the coding section 102. If the picture type of the video data to be coded next is "B-picture," the routine proceeds to a step ST207. Otherwise, the routine returns to the step ST201.

<Step ST207>

Figure 2B:
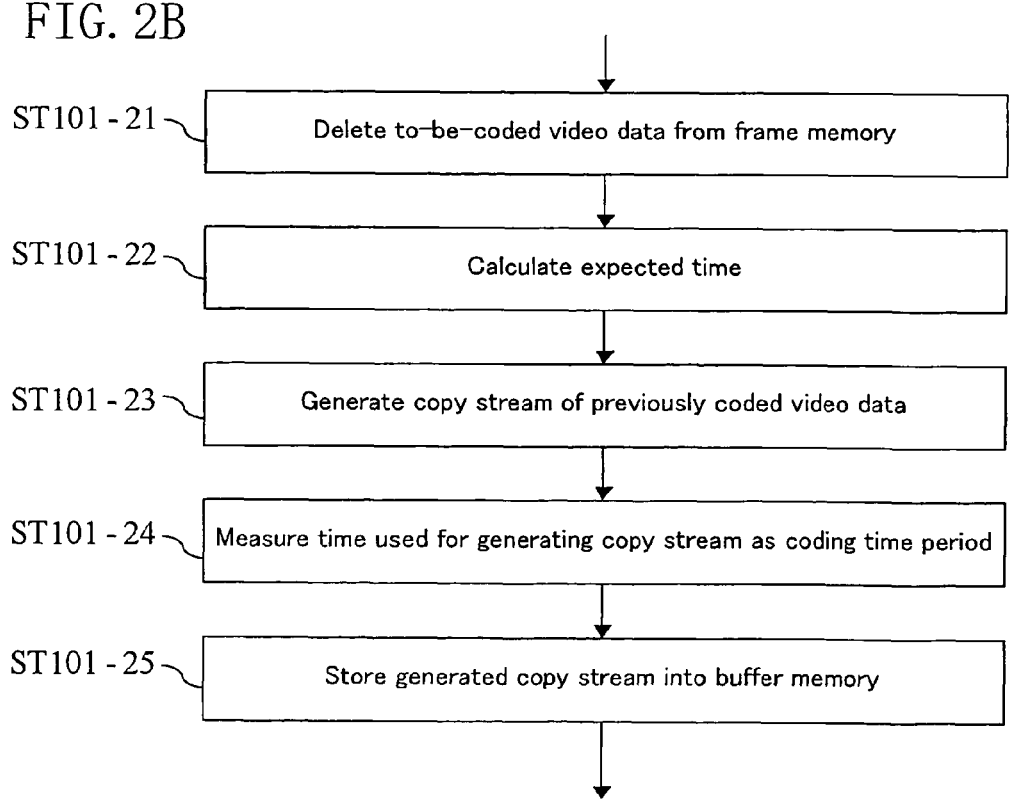
FIG. 2B is a flowchart for depicting compact coding processing.

The video data of which picture type is judged as "B-picture" in the step ST206 is subjected to the compact coding processing (FIG. 2B). Thus, coded video data is generated.

<Step ST208>

When the compact coding processing is completed, the coding control section 204 sets the coding mode of the coding section 102 and the coding mode of its own to "the normal mode." The routine then returns to the step ST202.

Specific Example

Figure 11:
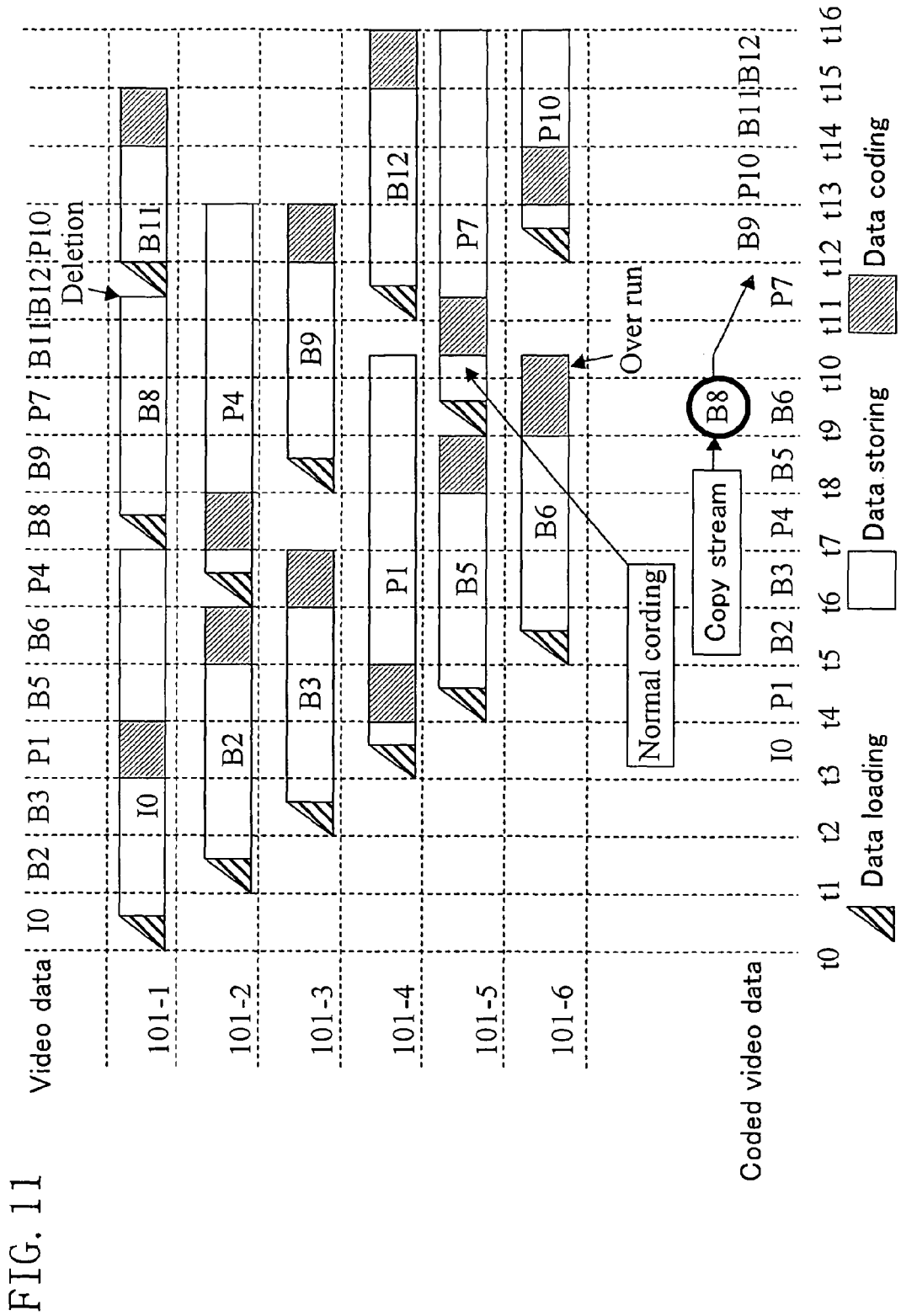
FIG. 11 is a timing chart for depicting compact coding processing shown in FIG. 10.

The compact coding processing (processing in the step ST207) depicted in FIG. 10 will be described in detail with reference to FIG. 11. Herein, video data I0, B2, B3, P1, B5, B6, P4, . . . , P10 are input in this order. In the drawing, "I," "P," and "B" mean an I-picture, a P-picture, and a B-picture, respectively.

Between time t0 and time t10, no overrun occurs in video data coding by the coding section 102, and therefore, the same processing as that in the normal mode (see FIG. 4) is executed.

When overrun occurs in coding the video data B6 by the coding section 102 between time t10 and time t11, the coding control section 204 judges that the coding time period measured by the processing time measuring section 103 is longer than the expected time. According to this judgment, the coding control section 204 sets the coding mode of the coding section 102 and the coding mode of its own from "the normal mode" to "the compact mode." When the coding section 102 completes coding of the video data B6, the picture type judging section 201 judges the picture type of the video data P7 to be coded next as "P-picture." According to this judgment, the coding section 102 and the coding control section 204 execute the normal coding processing for the video data P7 rather than the compact coding processing.

Between time t11 and time t12, when the coding section 102 completes coding of the video data P7, the picture type judging section 201 judges the picture type of the video data B8 to be coded next by the coding section 102 as "B-picture." According to this judgment, the coding section 102 and the coding control section 204 execute the compact coding processing for the video data B8 rather than the normal coding processing. In detail, the coding section 102 performs no coding on the video data B8, and the coding control section 204 deletes the video data B8 stored in the frame memory 101-1 and stores into the buffer memory 105 a copy stream of the coded video data P7 as coded video data B8. The frame memory 101-1 stops loading the video data B8 and starts loading the video data B11. When this compact coding processing for the video data B8 is completed, the coding control section 204 sets the coding mode of the coding section 102 and the coding mode of its own from "the compact mode" to "the normal mode."

At time t12, the coding section 102 starts coding the video data B9 stored in the frame memory 101-3 in accordance with the normal mode coding scheme.

Execution of the above described series of processing allows the buffer memory 105 to store the coded video data I0, P1, B2, . . . , P7 in this order, store the copy stream as the coded video data B8, and then, store the coded video data B9, P10, B11, and B12 in this order.

(Effects)

As described above, the compact coding processing is performed on a referencing image (of B-picture type) rather than a to-be-referenced image (of I-picture or P-picture types), suppressing significant lowering of image quality.

It is noted that employment of the coding section 102-1 shown in FIG. 6 rather than the coding section 102 shown in FIG. 9 can attain the same effects. Namely, the compact coding processing depicted in FIG. 7 may be performed in the step ST207.

Embodiment 3

(Entire Construction)

Figure 12:
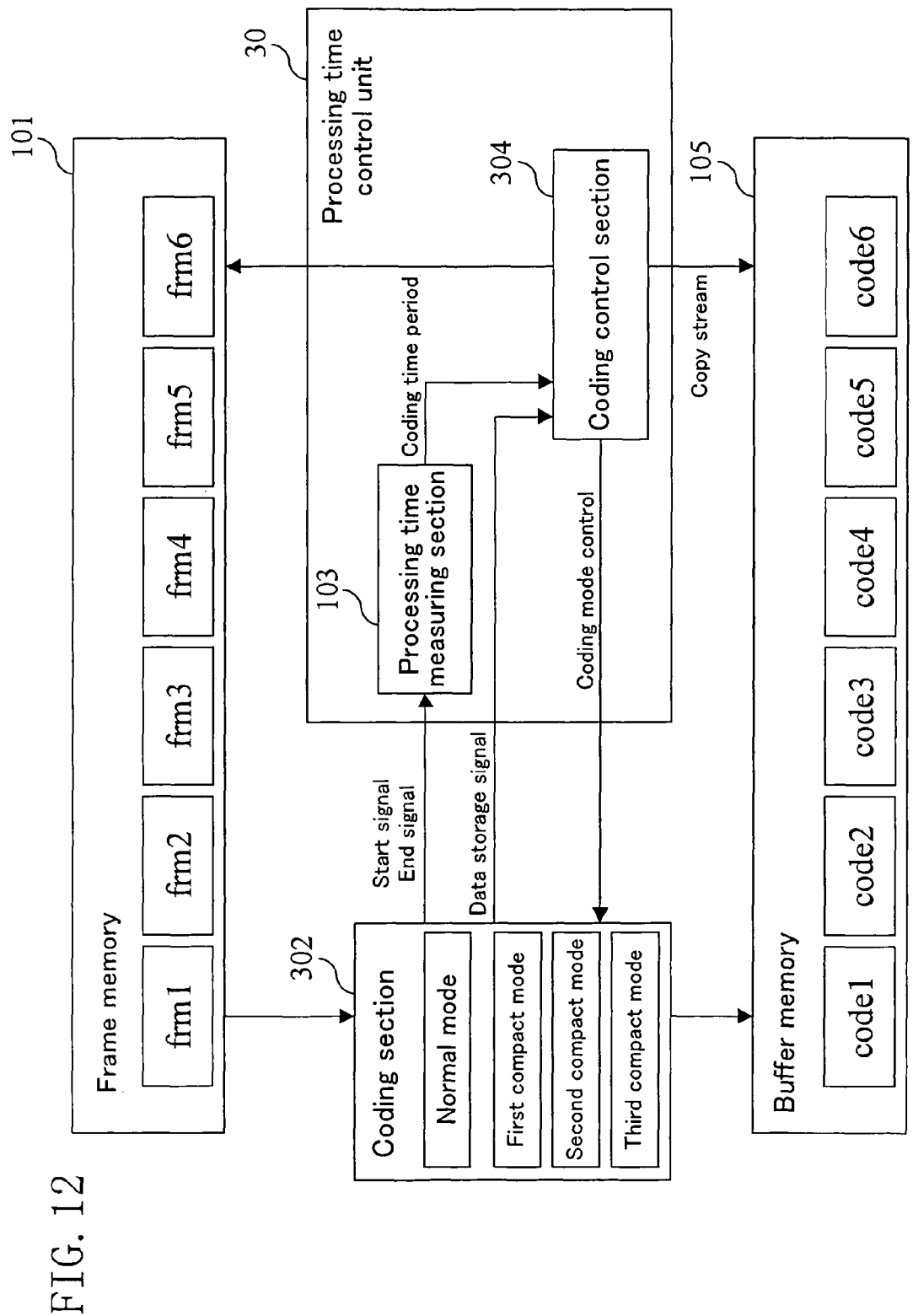
FIG. 12 is a block diagram showing an entire construction of a video coder according to Embodiment 3 of the present invention.

FIG. 12 shows an entire construction of a video coder according to Embodiment 3 of the present invention. This apparatus includes a coding section 302 and a processing time control unit 30 in lieu to the coding section 102 and the processing time control section 10 shown in FIG. 1. The other elements are the same as those shown in FIG. 1. The processing time control unit 30 includes the processing time measuring section 103 shown in FIG. 1 and a coding control section 304.

The coding section 302 executes the same operation as the coding section 102 shown in FIG. 1, wherein the coding modes of its own are different from those of the coding section 102. Namely, the coding section 302 has four coding modes of a normal mode, a first compact mode, a second compact mode, and a third compact mode, any one of which is set by the coding control section 304. The coding section 302 encodes video data to be coded next in accordance with the coding mode set by the coding control section 304. A coding scheme for the first compact mode is shorter than a coding scheme for the second compact mode in time necessary for coding. The coding scheme for the second compact mode is shorter than a coding scheme for the third compact mode in time necessary for coding. The coding scheme for the third compact mode is shorter than the normal mode coding scheme in time necessary for coding.

The coding control section 304 executes the same operation as the coding control section 104, wherein it controls the coding mode of the coding section 102 and the coding mode of its own differently therefrom. The coding control section 304 controls the coding mode of the coding section 102 and the coding mode of its own according to the extent of overrun of the coding time period. Specifically, the coding control section 304 calculates, on the basis of the frame rate of video data, times (first expected time, second expected time, and third expected time) which can be used for coding the video data. The second expected time is shorter than the first expected time. The third expected time is shorter than the second expected time. For example, the coding control section 304 calculates expected time on the basis of the frame rate of video data, similarly to the coding control section 104, adds a first threshold value, a second threshold value smaller than the first threshold value, and a third threshold value smaller than the second threshold value to the thus calculated expected time for calculating "the calculated expected time plus the first threshold value" as "the first expected time," "the calculated expected time plus the second threshold value" as "the second expected time," and "the calculated expected time plus the third threshold value" as "the third expected time." Then, the coding control section 304 compares the coding time period measured by the processing time measuring section 103 with the thus calculated first, second, and third expected times, and changes the coding mode of the coding section 302 and the coding mode of its own according to the comparison results.

(Operation)

Figure 13:
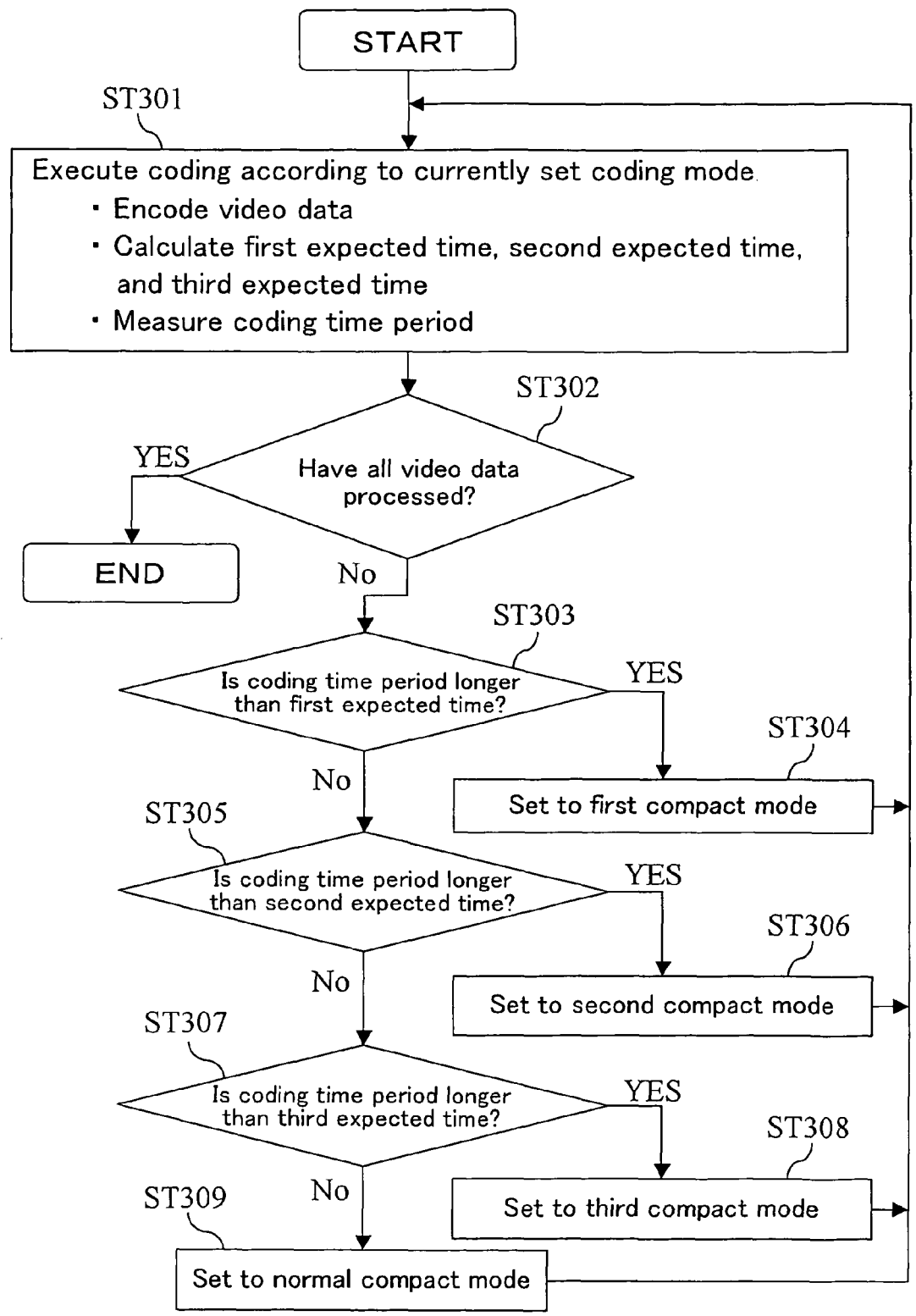
FIG. 13 is a flowchart for depicting an operation of the video coder shown in FIG. 12.

An operation of the video coder shown in FIG. 12 will be described next with reference to FIG. 13.

<Step ST301>

First, the coding section 102 and the coding control section 304 execute the coding processing according to the currently set coding mode (any one of the normal coding mode and the first to third compact coding modes). In detail, the series of processing of the steps ST101-11 to ST101-14 depicted in FIG. 2A is executed in the normal mode, or the series of processing of the steps ST101-31 to ST101-34 depicted in FIG. 7 is executed in any of the first to third compact modes. Though only one expected time is obtained in the step ST101-11 (FIG. 2A) and the step ST101-31 (FIG. 7), the coding control section 304 calculates the first expected time, the second expected time, and the third expected time herein.

<Step ST302>

Next, if all video data stored in the frame memory 101 have been coded, the processing terminates. Otherwise, the routine proceeds to a step ST303.

<Step ST303>

Subsequently, the coding control section 304 judges whether or not the coding time period measured by the processing time measuring section 103 is longer than the first expected time calculated in the step ST301. If the coding time period is longer than the first expected time, the routine proceeds to a step ST304. Otherwise, the routine proceeds to a step ST305.

<Step ST304>

Then, the coding control section 304 sets the coding mode of its own and the coding mode of the coding section 302 to "the first compact mode." The routine then returns to the step ST301.

<Step ST305>

When it is judged in the step ST303 that the coding time period is not longer than the first expected time, the coding control section 304 judges whether or not the coding time period is longer than the second expected time calculated in the step ST301. If the coding time period is longer than the second expected time, the routine proceeds to a step ST306. Otherwise, the routine proceeds to a step ST307.

<Step ST306>

Next, the coding control section 304 sets the coding mode of its own and the coding mode of the coding section 302 to "the second compact mode." The routine then returns to the step ST301.

<Step ST307>

On the other hand, when it is judged in the step ST305 that the coding time period is not longer than the second expected time, the coding control section 304 judges whether or not the coding time period is longer than the third expected time calculated in the step ST301. If the coding time period is longer than the third expected time, the routine proceeds to a step ST308. Otherwise, the routine proceeds to a step ST309.

<Step ST308>

Subsequently, the coding control section 304 sets the coding mode of its own and the coding mode of the coding section 302 to "the third compact mode." The routine then returns to the step ST301.

<Step ST309>

On the other hand, when it is judged in the step ST307 that the coding time period is not longer than the third expected time, the coding control section 304 sets the coding mode of its own and the coding mode of the coding section 302 to "the normal mode." The routine then returns to the step ST301.

(Effects)

As described above, the coding scheme for video data to be coded next is changed according to the extent of overrun of the coding time period in the coding section, thereby suppressing significant degradation of image quality and lowering of temporal continuity and eliminating overrun of the coding time period.

In the present embodiment, the coding control section 304 compares the coding time period measured by the processing time measuring section 103 with the respective three kinds of expected times, but the number of expected times to be compared therewith is not limited to three.

In the first compact mode, the coding section 302 and the coding control section 304 may execute the compact coding processing depicted. in FIG. 2B.

Embodiment 4

(Entire Construction)

Figure 14:
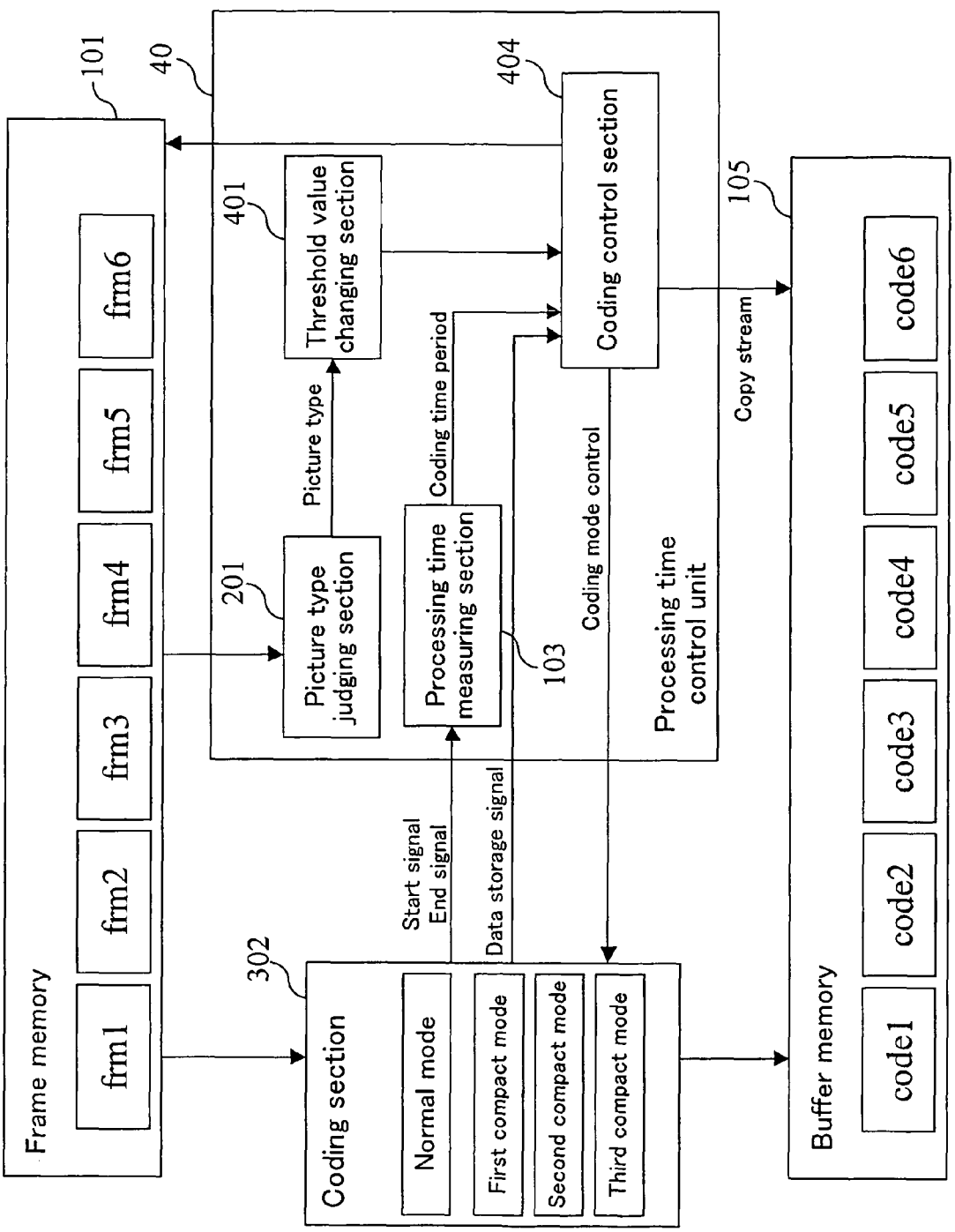
FIG. 14 is a block diagram showing an entire construction of a video coder according to Embodiment 4 of the present invention.

FIG. 14 shows an entire construction of a video coder according to Embodiment 4 of the present invention. This apparatus includes a processing time control unit 40 in lieu to the processing time control unit 30 shown in FIG. 12. The other elements are the same as those in FIG. 12. The processing time control unit 40 includes the processing time measuring section 103 shown in FIG. 1, the picture type judging section 201 shown in FIG. 9, a threshold value changing section 401, and a coding control section 404.

The threshold value changing section 401 changes a first threshold value, a second threshold value, and a third threshold value, which are used for judging the extent of overrun of a coding time period in the coding control section 404, according to a picture type judged by the picture type judging section 201.

The coding control section 404 executes the same operation as the coding control section 304, wherein the first expected time, the second expected time, and the third expected time are calculated differently therefrom. The coding control section 304 calculates the first expected time, the second expected time, and the third expected time with the use of the first threshold value, the second threshold value, and the third threshold value set by the threshold value changing section 401.

(Operation)

Figure 15:
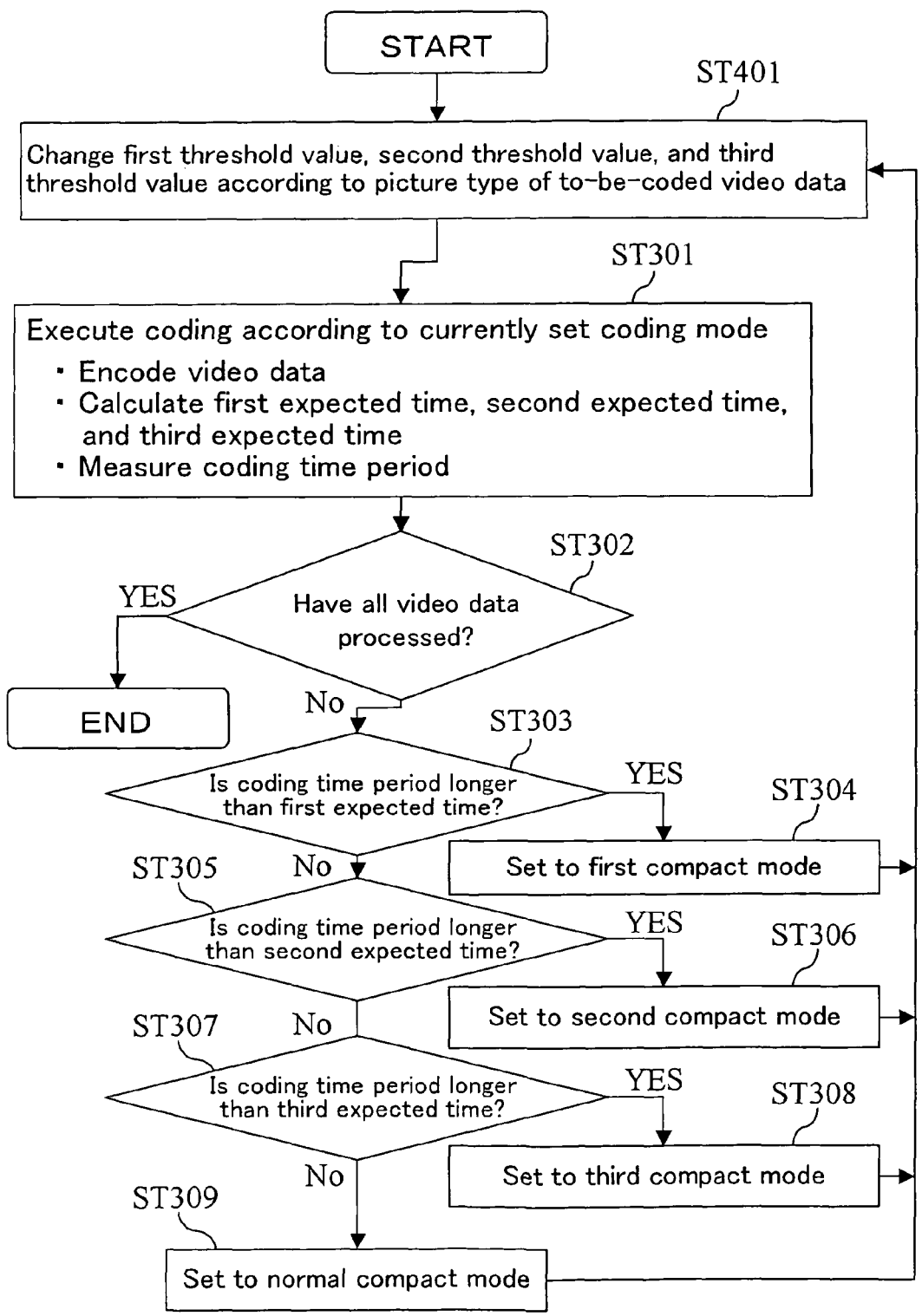
FIG. 15 is a flowchart for depicting an operation of the video coder shown in FIG. 14.

An operation of the video coder shown in FIG. 14 will be described with reference to FIG. 15.

<Step ST401>

First, the picture type judging section 21 judges the picture type of video data to be coded next by the coding section 302. The threshold value changing section 401 sets the first threshold value, the second threshold value, and the third threshold value according to the judgment result of the picture type judging section 201. For example, the threshold value changing section 401 stores in advance a first threshold value, a second threshold value, and a third threshold value for the I-picture type, a first threshold value, a second threshold value, and a third threshold value for the P-picture type, and a first threshold value, a second threshold value, and a third threshold value for the B-picture type, and selects from them the first threshold value, the second threshold value, and the third threshold value for a picture type judged by the picture type judging section 201. The second threshold value is smaller than the first threshold value, and the third threshold value is smaller than the second threshold value.

<Step ST301>

Next, the same processing as the processing in the step ST301 is executed. Herein, the coding control section 404 calculates the first expected time, the second expected time, and the third expected time with the use of the first threshold value, the second threshold value, and the third threshold value set by the threshold value changing section 401. For example, the coding control section 404 calculates the first expected time by adding the first threshold value calculated by the threshold value changing section 401 to the expected time calculated based on the frame rate of the video data.

<Steps ST302 to ST309>

Subsequently, the same series of processing as that in the steps ST302 to ST309 are executed.

(Threshold Value Setting)

Figure 16:
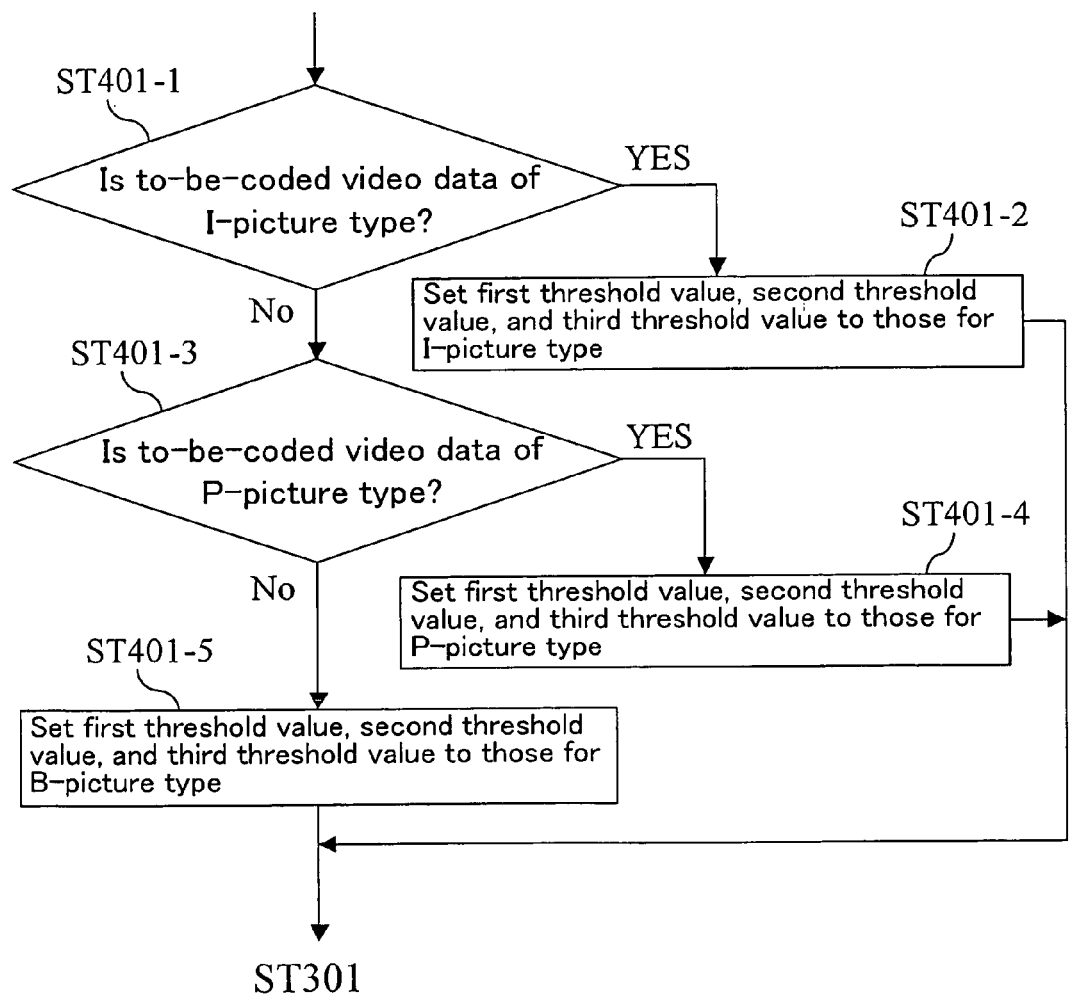
FIG. 16 is a flowchart for depicting processing of a step ST401 indicatec in FIG. 15.

How the threshold value changing section 401 sets the threshold values (processing in the step ST401) will be described next with reference to FIG. 16.

<Step ST401-1>

The picture type judging section 201 judges whether or not the type of video data to be coded by the coding section 302 is "I-picture." If the video data is of "I-picture" type, the routine proceeds to a step ST401-2. Otherwise, the routine proceeds to a step ST401-3.

<Step ST401-2>

Next, the threshold value changing section 401 sets the first threshold value, the second threshold value, and the third threshold value, which are used respectively for calculating the first expected time, the second expected time, and the third expected time in the coding control section 404, to the first threshold value, the second threshold value, and the third threshold value for the I-picture type, respectively. The routine then returns to the step ST301.

<Step ST401-3>

On the other hand, when it is judged in the step ST401-1 that the type of the video data is not "I-picture," the picture type judging section 201 judges whether or not the type of the video data to be coded by the coding section 302 is "P-picture." If the video data is of "P-picture" type, the routine proceeds to a step ST401-4. Otherwise, the routine proceeds to a step ST401-5.

<Step ST401-4>

Next, the threshold value changing section 401 sets the first threshold value, the second threshold value, and the third threshold value, which are used respectively for calculating the first expected time, the second expected time, and the third expected time in the coding control section 404, to the first threshold value, the second threshold value, and the third threshold value for the P-picture type, respectively. The routine then returns to the step ST301.

<Step ST401-5>

On the other hand, when the picture type judging section 201 judges in the step ST401-3 that the type of the video data is not "P-picture," the first threshold value, the second threshold value, and the third threshold value, which are used respectively for calculating the first expected time, the second expected time, and the third expected time in the coding control section 404, are set to the first threshold value, the second threshold value, and the third threshold value for the B-picture type. The routine then returns to the step ST301.

(Effects)

As described above, the criteria (the first expected time, the second expected time, and the third expected time) for judging the extent of overrun of a coding time period are changed according to the picture type of video data to be coded next, thereby further suppressing significant degradation of image quality and lowering of temporal continuity and eliminating overrun of a coding time period.

In the present embodiment, the coding control section 404 compares a coding time period measured by the processing time measuring section 103 with three kinds of expected times, but the number of expected times for comparison is not limited to three.

Embodiment 5

(Entire Construction)

Figure 17:
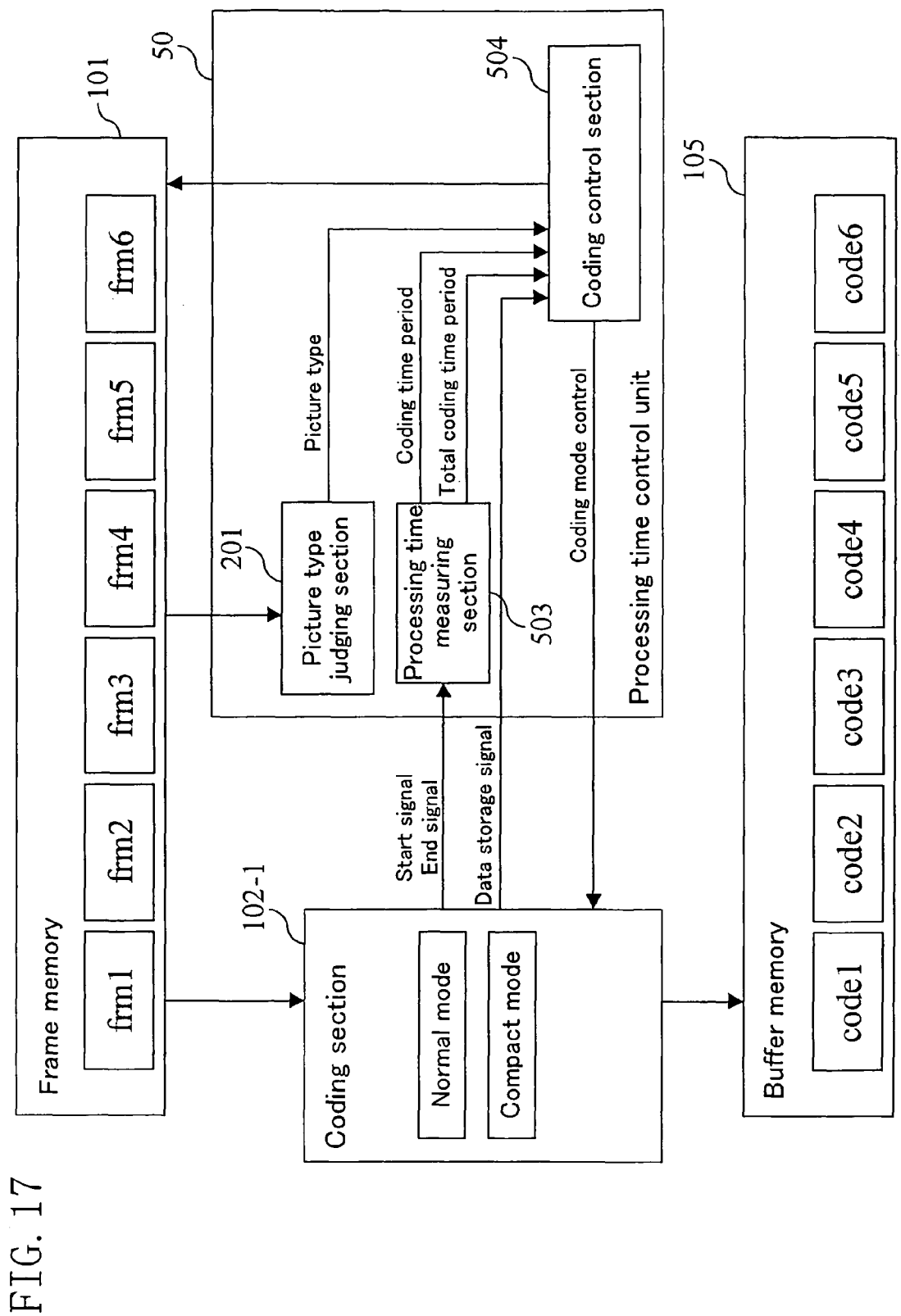
FIG. 17 is a block diagram showing an entire construction of a video coder according to Embodiment 5 of the present invention.

FIG. 17 shows an entire construction of a video coder according to Embodiment 5 of the present invention. This apparatus includes a processing time control unit 50 in lieu to the processing time control unit 10-1 shown in FIG. 6. The other elements are the same as those in FIG. 6. The processing time control unit 50 includes the picture type judging section 201 shown in FIG. 9, a processing time measuring section 503, and a coding control section 504.

The processing time measuring section 503 measures a coding time period, similarly to the processing time measuring section 103. The processing time measuring section 503 also measures a time period (a total coding time period) used for coding one picture group. The picture group means an aggregation of one to-be-referenced image ("I-picture" or "P-picture") and a referencing image present between the to-be-referenced image and a to-be-referenced image to be coded thereafter. Specifically, the processing time measuring section 503 obtains a total coding time period by accumulating coding time periods measured in a period from the time when the picture type judging section 201 judges video data as a to-be-referenced image (of "I-picture" type or "P-picture" type) to the time when the picture type judging section 201 judges video data as a to-be-referenced image next.

The coding control section 504 executes the same operation as the coding control section 104-1, wherein it controls the coding mode of a coding section 102-1 differently therefrom. The coding control section 504 calculates time (total expected time) which can be used for coding one picture group. Specifically, the coding control section 504 calculates a total expected time by accumulating expected times calculated in a period from the time when the picture type judging section 201 judges video data as "a to-be-referenced image" to the time when the picture type judging section 201 judges next video data as "a to-be-referenced image." The coding control section 504 then compares the total coding time period measured by the processing time measuring section 503 with the thus calculated total expected time, and changes the coding mode of the coding section 102-1 according to the comparison result.

(Operation)

Figure 18:
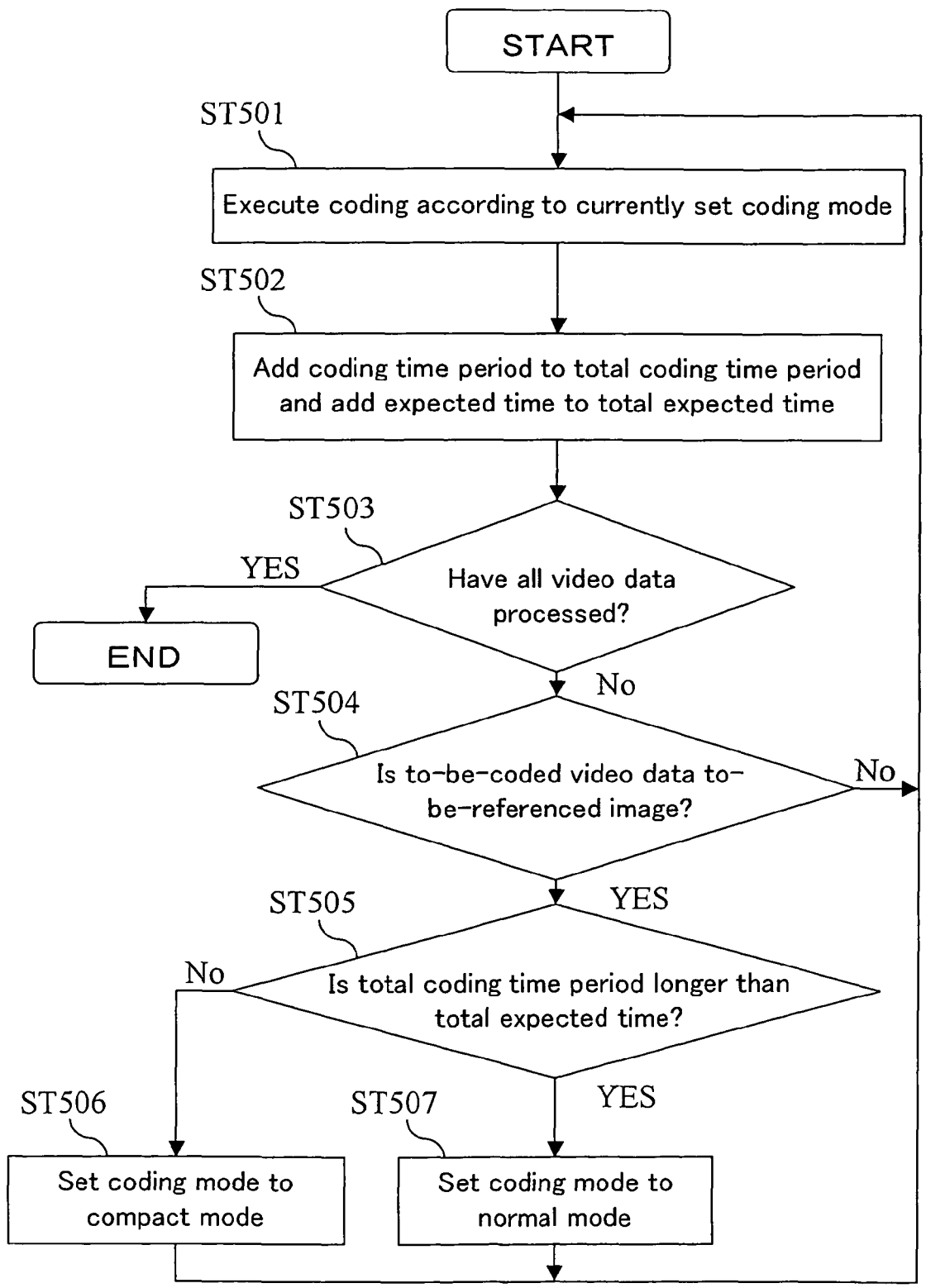
FIG. 18 is a flowchart for depicting an operation of the video coder shown in FIG. 17.

An operation of the video coder shown in FIG. 17 will be described next with reference to FIG. 18.

<Step ST501>

First, the normal coding processing (FIG. 2A) or the compact coding processing (FIG. 2B) is executed according to the currently set coding mode.

<Step ST502>

Next, the processing time measuring section 503 adds a coding time period measured in the step ST501 to a total coding time period. The coding control section 504 adds expected time calculated in the step ST501 to a total expected time.

<Step ST503>

If all video data stored in the frame memory 101 have been coded, the processing terminates. Otherwise, the routine proceeds to a step ST504.

<Step ST504>

Subsequently, the picture type judging section 201 judges a picture type of video data to be coded next by the coding section 102-1. If the video data to be coded next is a to-be-referenced image, the routine proceeds to a step ST505. Otherwise, the routine returns to the step ST501.

<Step ST505>

Next, the coding control section 504 judges whether or not the total coding time period measured by the processing time measuring section 503 is longer than the total expected time calculated in the step ST502. If the total coding time period is longer than the total expected time, the routine proceeds to a step ST506. Otherwise, the routine proceeds to a step ST507.

<Step ST506>

The coding control section 504 sets the coding mode of its own and the coding mode of the coding section 102-1 to "the compact mode." The routine then returns to the step ST501.

<Step ST507>

On the other hand, when the total coding time period is not longer than the total expected time in the step ST505, the coding control section 504 sets the coding mode of its own and the coding mode of the coding section 102-1 to "the normal mode." The routine then returns to the step ST501.

Specific Example

Figure 19:
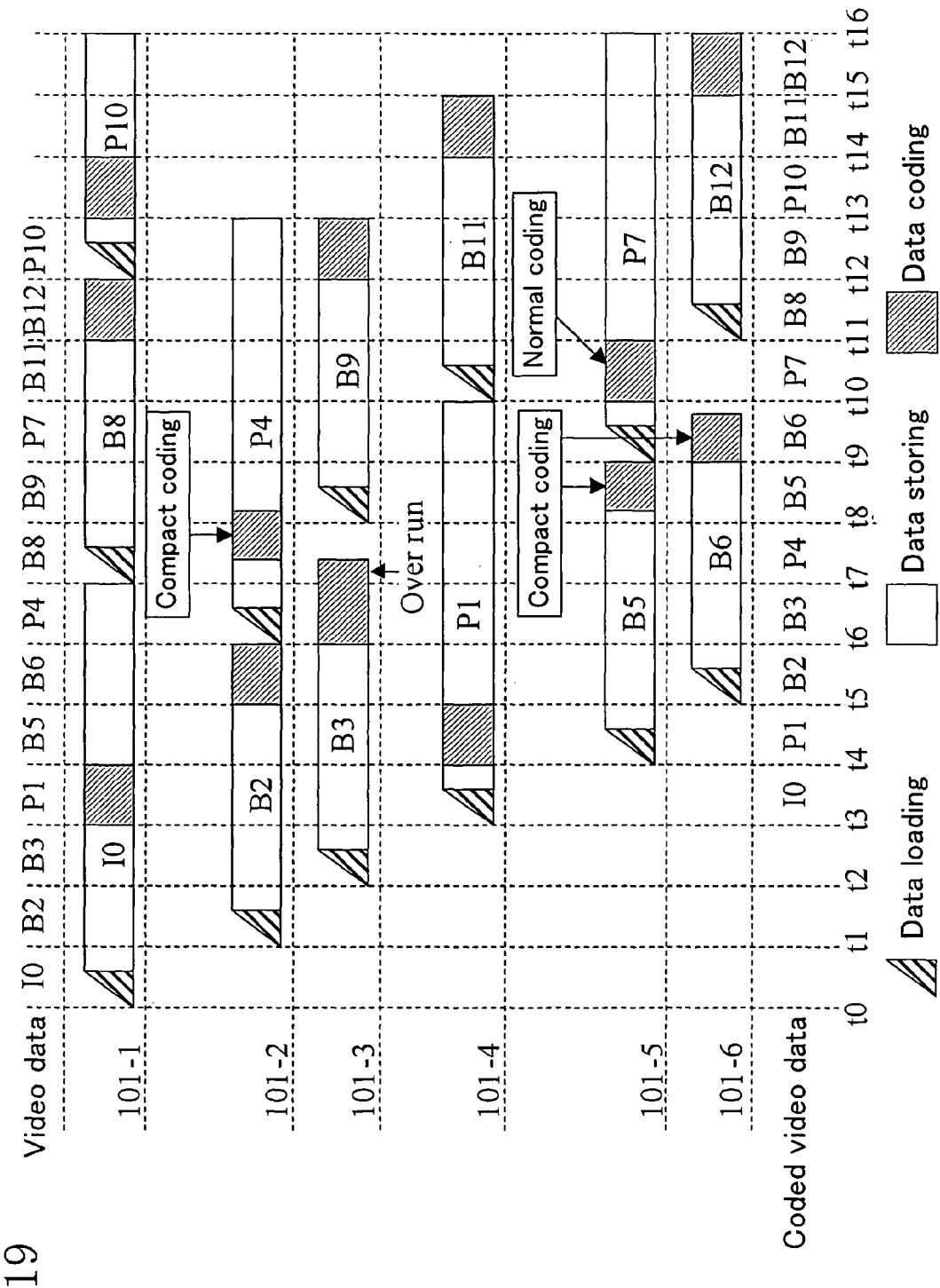
FIG. 19 is a timing chart for depicting compact coding processing shown in FIG. 18.

The processing depicted in FIG. 18 will be described here in detail with reference to FIG. 19. It is supposed herein that video data I0, B2, B3, P1, B5, B6, P4, . . . P10 are input in this order. Wherein, "I," "P," and "B" in the drawing mean I-picture, P-picture, and B-picture, respectively.

Between time t0 and time t7, no overrun occurs in video data coding by the coding section 102-1, and therefore, the same processing as the normal coding processing (see FIG. 4) is executed.

Suppose that overrun occurs in coding the video data B3 by the coding section 102-1 between time t7 and time t8. At this time point, the picture type judging section 201 has judged the type of the video data P4 to be coded next by the coding section 102-1 as "P-picture," and the total coding time period measured by the processing time measuring section 503 is longer than the total expected time. Accordingly, the coding control section 504 sets the coding mode of its own and the coding mode of the coding section 102-1 to "the compact mode." In response, the coding section 102-1 starts, after coding of the video data B3 is completed, coding the video data P4 stored in the frame memory 101-2 in accordance with the compact mode coding scheme.

Between time t8 and time t10, the coding section 102-1 completes coding of the video data P4, and the coded video data P4 generated through the compact coding processing is stored into the buffer memory 105. Further, the coding section 102-1 starts coding the video data B5 stored in the frame memory 101-5 in accordance with the compact mode coding scheme, similarly to coding of the video data P4. When the coding section 102-1 completes coding of the video data B5, the coded video data B5 generated through the compact coding processing is stored into the buffer memory 105. The coding section 102-1 then starts coding the video data B6 stored in the frame memory 101-6. When the coding section 102-1 completes coding of the video data B6, the coded video data B6 generated through the compact coding processing is stored into the buffer memory 105. At this time point, the picture type judging section 201 judges the picture type of the video data P7 to be coded next by the coding section 102-1 as "P-picture." The coding control section 504 judges that the total coding time period is not longer than the total expected time and, accordingly, sets the coding mode of its own and the coding mode of the coding section 102-1 to "the normal mode."

At time t0, the coding section 102-1 starts coding the video data P7 stored in the frame memory 101-5 in accordance with the normal mode coding scheme.

At time t11, the coding section 102-1 completes coding of the video data P7. Then, the coded video data P7 generated through the normal coding processing is stored into the buffer memory 105

Figure 20A:
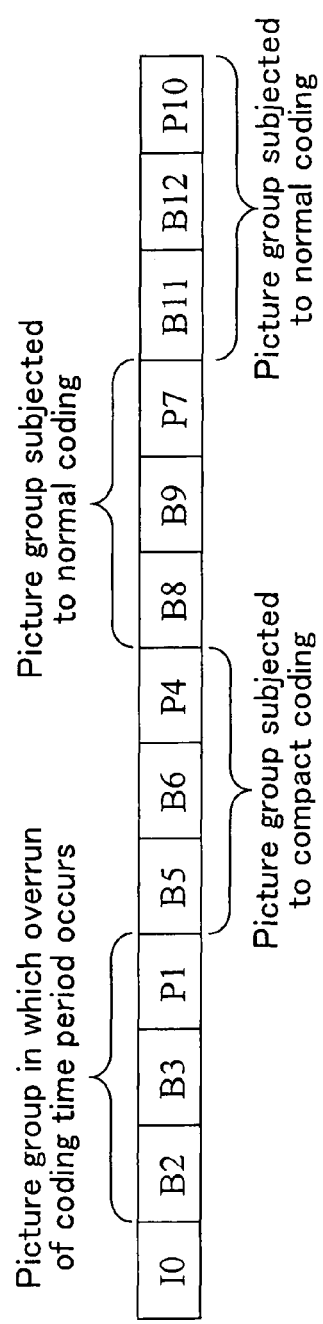
FIG. 20A is a diagram for depicting compact coding processing executed on a picture group unit basis.

Through execution of the above described series of processing, whether or not the coding time is longer than the expected time is judged unit by unit of the picture group, as shown in FIG. 20A, so that compact coding is executed on a picture group unit basis .

(Effects)

As described above, the compact coding processing is executed on the picture group unit basis, thereby maintaining temporal continuity and attaining coding with degradation of image quality suppressed.

Figure 20B:
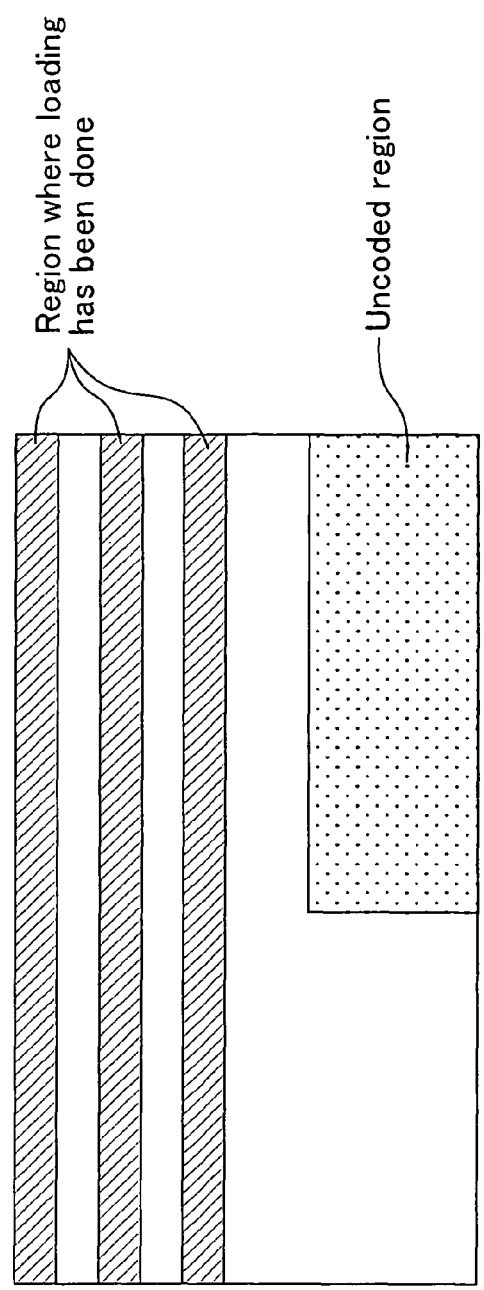
FIG. 20B is a diagram for depicting video data loading.

In employing the present invention, when the processing time is longer than the expected time, a frame memory for image loading is short, and therefore, an auxiliary frame memory may be necessitate. As shown in FIG. 20B, an image is loaded sequentially from the upper part thereof, and therefore, an uncoded region where coding is not completed yet is dominantly located at the lower part thereof. Hence, no auxiliary frame memory is needed when the uncoded region is controlled not to be loaded.

It is noted that employment of the coding section 102 shown in FIG. 1 rather than the coding section 102-1 attains the same effects. In other words, the compact coding processing shown in FIG. 2B may be executed in the step ST501.

Embodiment 6

(Entire Construction)

Figure 21:
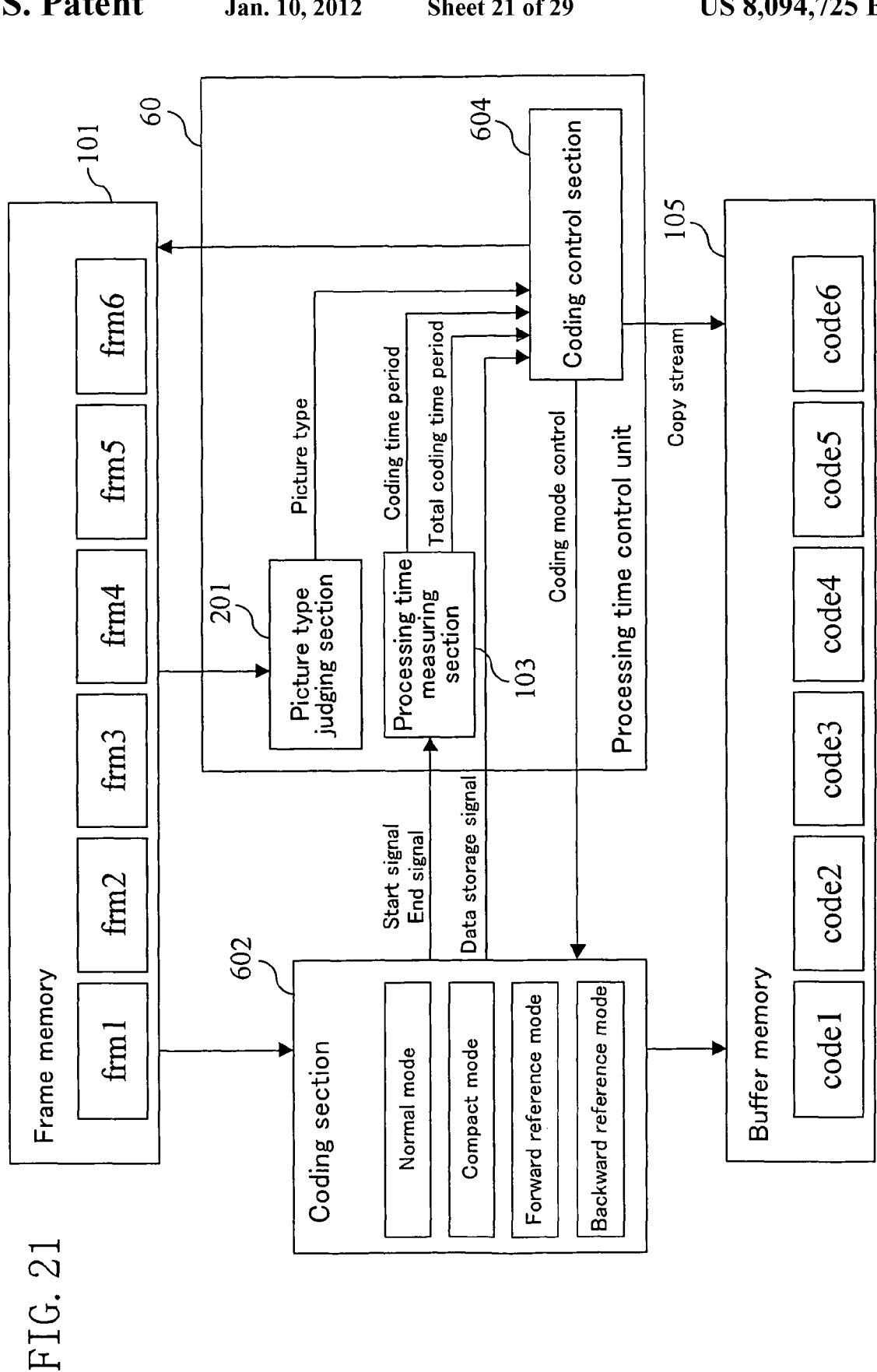
FIG. 21 is a block diagram showing an entire construction of a video coder according to Embodiment 6 of the present invention.

FIG. 21 shows an entire construction of a video coder according to Embodiment 6 of the present invention. This apparatus includes a coding section 602 and a processing time control unit 60 in lieu to the coding section 102 and the processing time control unit 10 shown in FIG. 1. The other elements are the same as those in FIG. 1.

The coding section 602 is the same as the coding section 102 shown in FIG. 1 and has additional two coding modes of a forward reference mode and a backward reference mode. When the coding mode is set to the forward reference mode by a coding control section 604, the coding section 602 encodes video data to be coded next by referencing a to-be-referenced image located before the video data. As well, when the coding mode is set to the backward reference mode, the coding section 602 encodes video data to be coded next by referencing a to-be-referenced image located after the video data.

The coding control section 604 executes the same operation as the coding control section 104 and further executes suppression processing for suppressing image noise. The coding control section 604 controls the coding mode of the coding section 602 and the coding mode of its own according to the judgment result by the picture type judging section 201.

(Operation)

Figure 22:
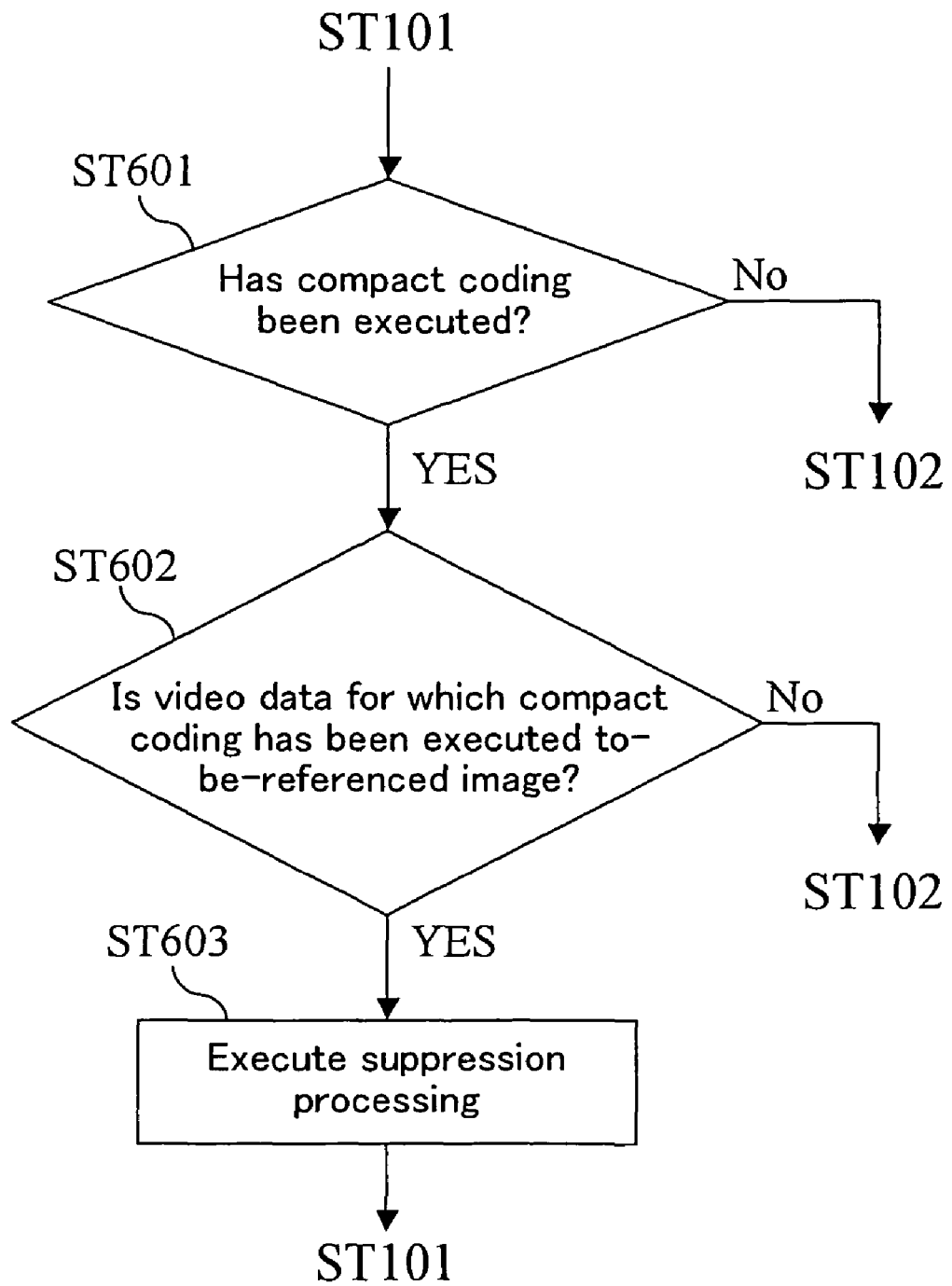
FIG. 22 is a flowchart for depicting an operation of the video coder shown in FIG. 21.

An operation of the video coder shown in FIG. 21 will be described next with reference to FIG. 22. This video coder executes the following processing in addition to the processing depicted in FIG. 3.

<Step ST601>

When the processing in the step ST101 is completed, the coding control section 604 judges whether or not the compact coding processing has been executed in the step ST101. If the compact coding processing has been executed, the routine proceeds to a step ST602. Otherwise, the routine proceeds to the step ST102.

<Step ST602>

Next, the picture type judging section 201 judges the picture type of the video data for which the compact coding processing has been executed in the step ST101. If the video data is a to-be-referenced image (of "I-picture" or P-picture" type), the routine proceeds to a step ST603. Otherwise, the routine proceeds to the step ST102.

<Step ST603>

Subsequently, the suppression processing is executed. In the suppression processing, the coding control section 604 controls the coding mode of the coding section 602 and the coding mode of its own so that the video data (video data deleted from the frame memory 101) for which the compact coding processing has been executed in the step ST101 is not referenced in video data coding in the coding section 602. After completion of the suppression processing, the routine proceeds to the step ST101.

(Suppression Processing)

Figure 23:
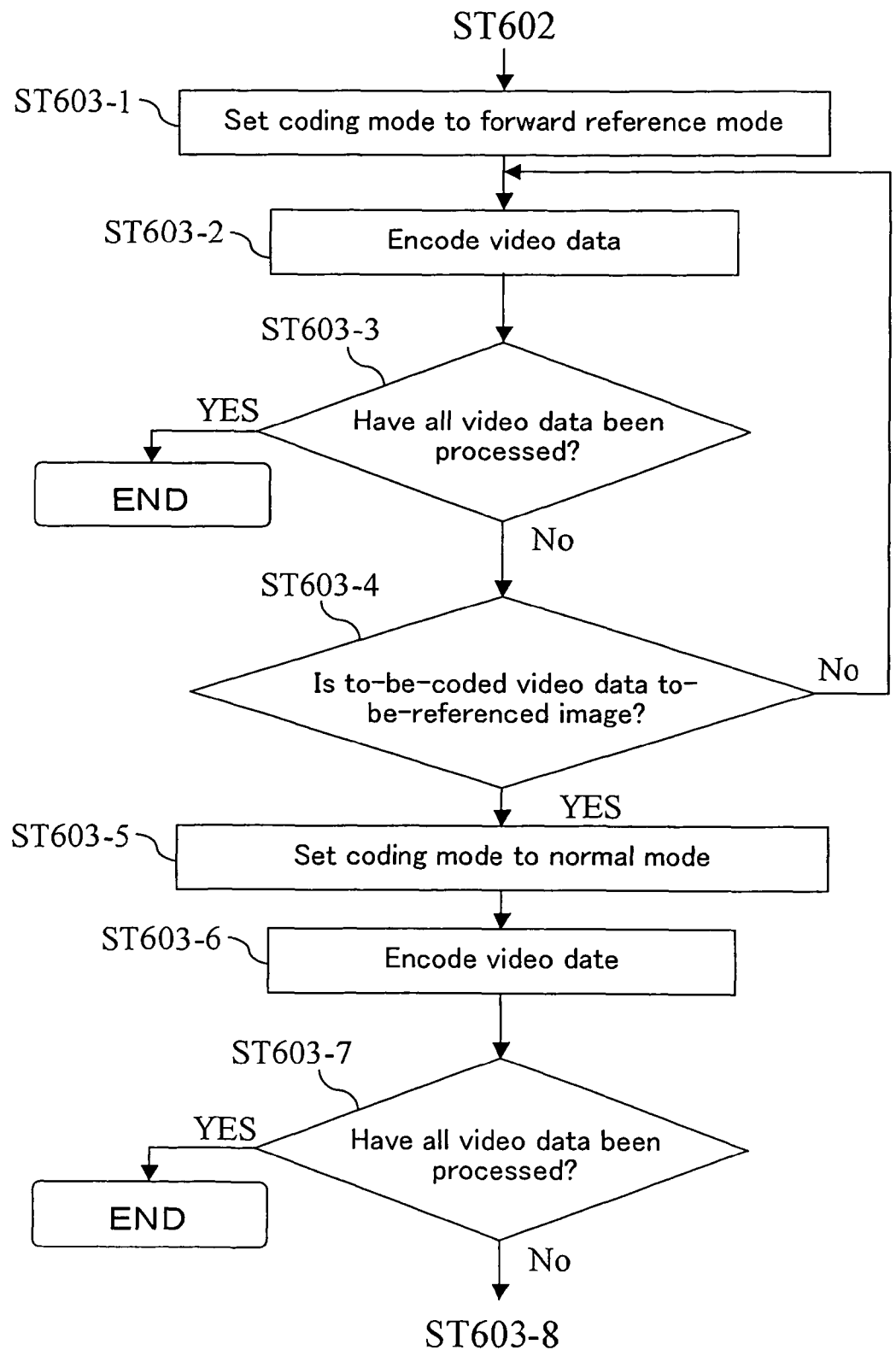
FIG. 23 is a flowchart for depicting suppression processing shown in FIG. 22
Figure 24:
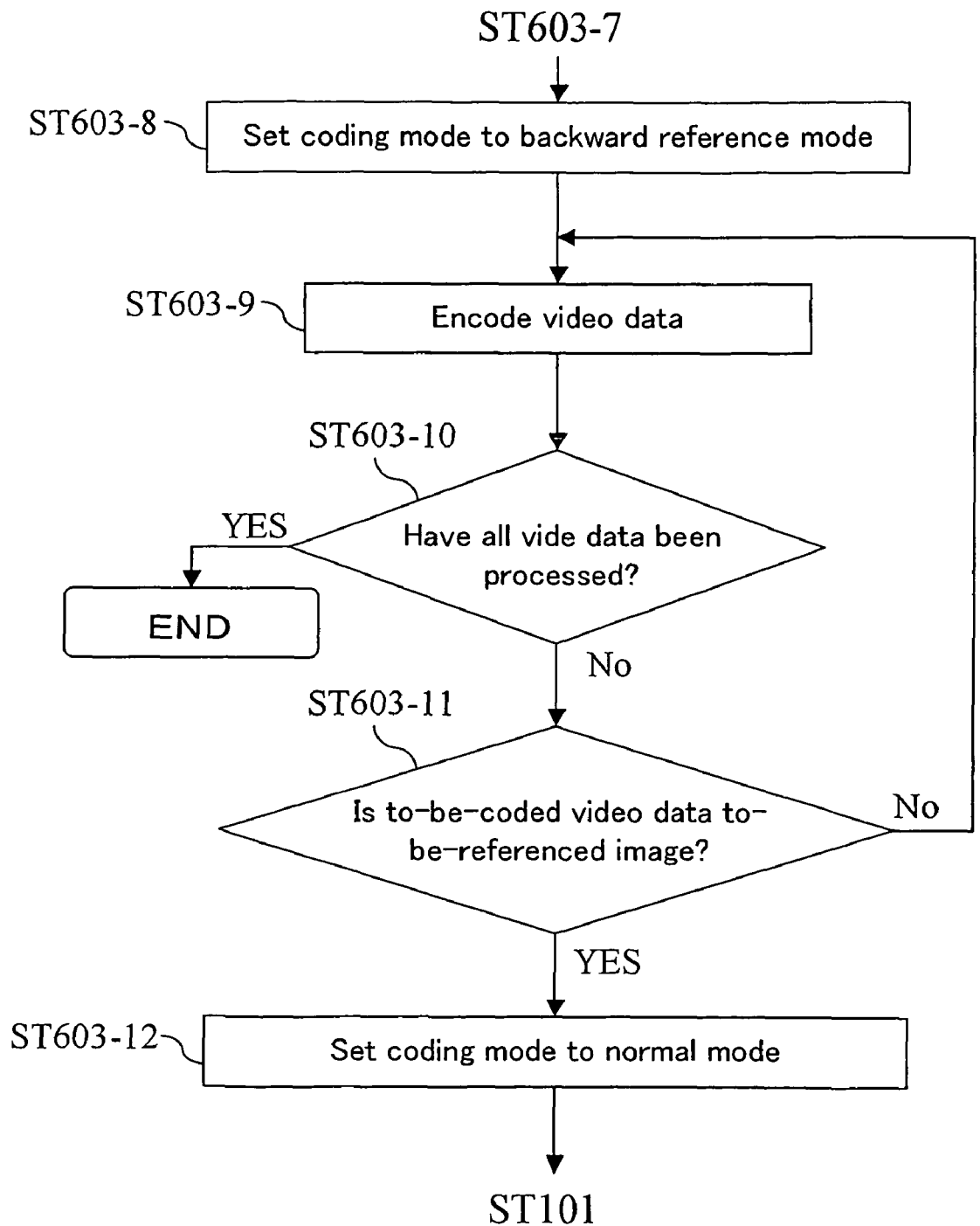
FIG. 24 is a flowchart for depicting the suppression processing shown in FIG. 22.

The suppression processing (the processing in the step ST603) depicted in FIG. 22 will be described here with reference to FIG. 23 and FIG. 24.

<Step ST603-1>

Figure 25:
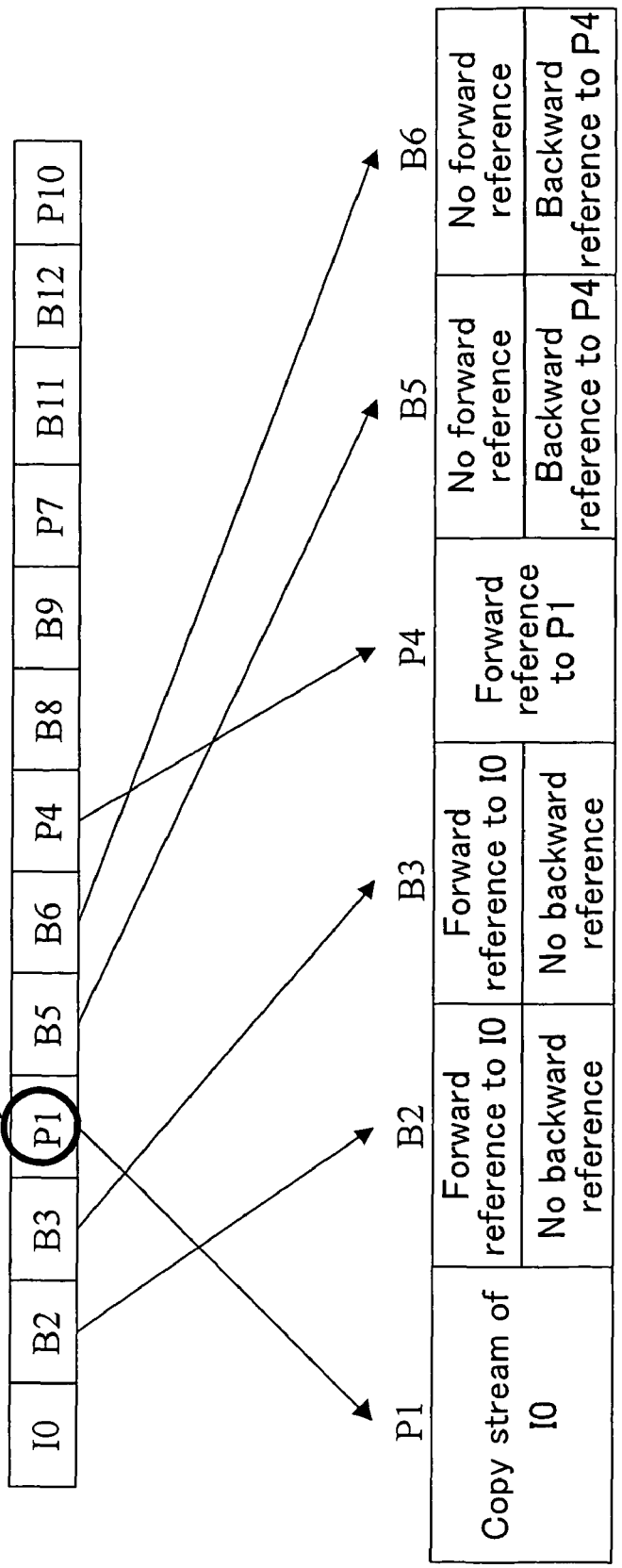
FIG. 25 is a diagram for depicting video data referenced in the suppression processing.

The coding control section 604 changes the coding mode of its own and the coding mode of the coding section 602 from "the normal mode" to "the forward reference mode." When the coding mode is set to the forward reference mode, the coding section 602 encodes video data to be coded next by referencing a to-be-referenced image located before the video data to be coded next without referencing the video data for which the compact coding processing has been executed in the step ST108. For example, as shown in FIG. 25, the coding section 602 references the video data I0 for coding video data B2 and B3 present between the video data 10 and P1 without referencing the video data P1 for which the compact coding processing has been executed.

<Step ST603-02>

Next, the coding section 602 encodes video data to be coded next in accordance with the forward reference mode. The coded video data is stored into the buffer memory 105.

<Step ST603-3>

If all video data stored in the frame memory 101 have been coded, the processing terminates. Otherwise, the routine proceeds to a step ST603-4.

<Step ST603-4>

Subsequently, the picture type judging section 201 judges a picture type of video data to be coded next by the coding section 602. If the video data to be coded next is a to-be-reference image, the routine precedes to a step ST 603-5. Otherwise, the routine returns to the step ST603-2.

<Step ST603-5>

Then, the coding control section 604 changes the coding mode of its own and the coding mode of the coding section 602 from "the forward reference mode" to "the normal mode."

<Step ST603-6>

The coding section 602 encodes the video data to be coded next in accordance with the normal mode coding scheme. The coded video data is stored into the buffer memory 105.

<Step ST603-7>

If all data stored in the frame memory 101 have been coded, the processing terminates. Otherwise, the routine proceeds to a step ST603-8 (FIG. 24).

<Step ST603-8>

Next, the coding control section 604 changes the coding mode of its own and the coding mode of the coding section 602 from "the normal mode" to "the backward reference mode." When the coding mode is set to the backward reference mode, the coding section 602 encodes video data to be coded next by referencing a to-be-referenced image located after the video data to be coded next without referencing the video data for which the compact coding processing has been executed in the step ST108 (FIG. 3). For example, as shown in FIG. 25, the coding section 602 references the video data P4 for coding the video data B5 and B6 present between the video data P1 and P4 without referencing the video data P1 for which the compact coding processing has been executed.
<Step ST603-9>

Subsequently, the coding section 602 encodes the video data to be coded next in accordance with the backward reference mode. The coded video data is stored into the buffer memory 105.
<Step ST603-10>

If all video data stored in the frame memory have been coded, the proceeding terminates. Otherwise, the routine proceeds to a step ST603-11.
<Step ST603-11>

Next, the picture type judging section 201 judges a picture type of video data to be coded next by the coding section 602. If the video data to be coded next is a to-be-referenced image, the routine proceeds to a step ST603-12. Otherwise, the routine returns to the step ST603-9.
<Step ST603-12>

The coding control section 604 changes the coding mode of its own and the coding mode of the coding section 602 from "the backward reference mode" to "the normal mode." The routine then returns to the step ST101.

(Effects)

As described above, video data is coded without referencing video data (herein, video data deleted from the frame memory) for which the compact coding processing has been executed, thereby reducing picture that might cause image noise.

In addition, an increase in processing time for rate control can be suppressed in video data to be coded by referencing video data for which the compact coding processing has been executed, thereby reducing a coding time period. Further, coding by forward reference or backward reference rather than coding by bidirectional reference is executed for video data to be coded by referencing video data for which the compact coding processing has been executed, resulting in reduction in coding time period.

It is noted that the same effects can be obtained by employing the coding section 102-1 shown in FIG. 6 rather than the coding section 602 shown in FIG. 21. In other words, the compact coding processing depicted in FIG. 7 may be executed in the step ST101.

Embodiment 7

(Entire Construction)

Figure 26:
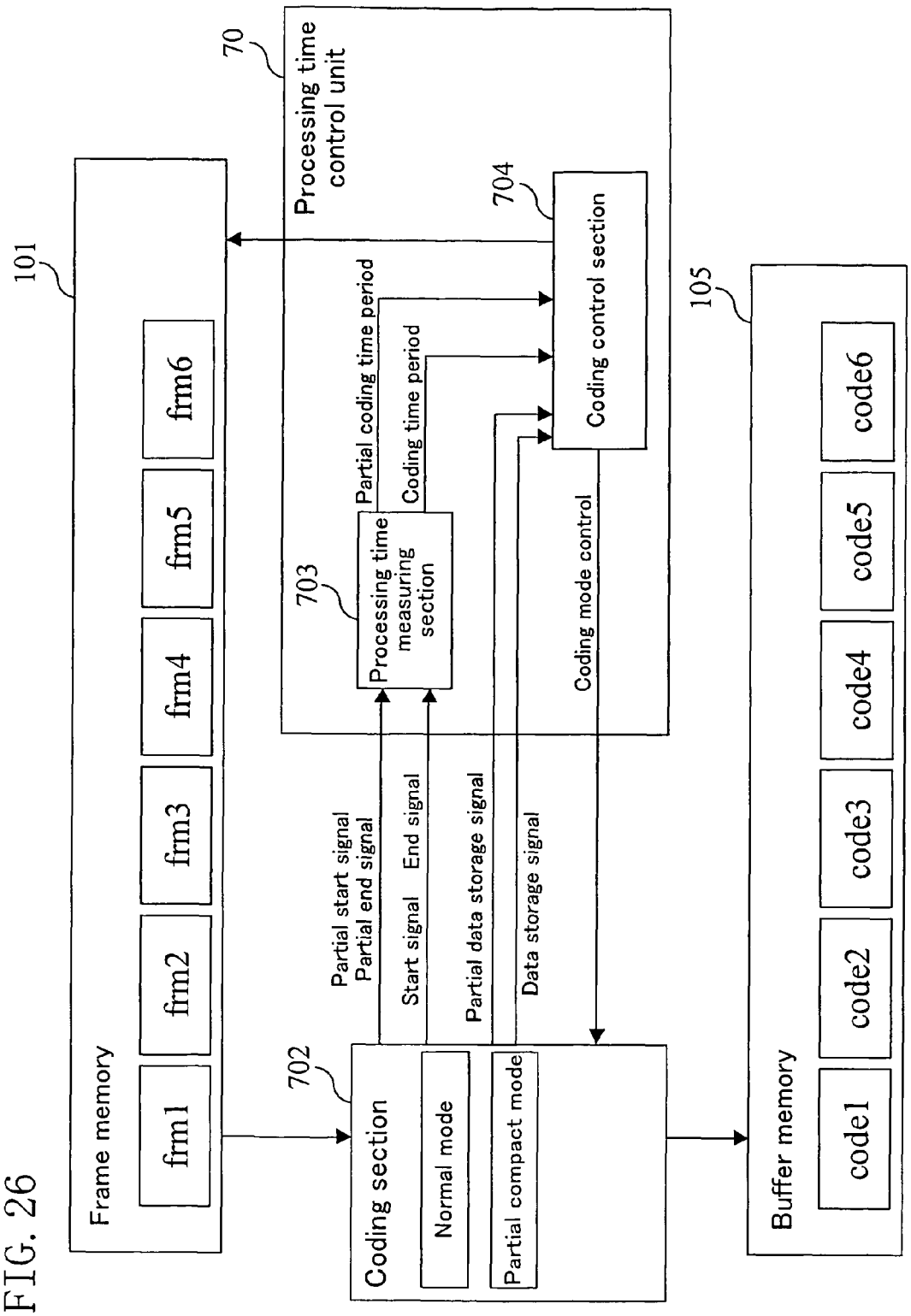
FIG. 26 is a block diagram showing an entire construction of a video coder according to Embodiment 7 of the present invention.

FIG. 26 shows an entire construction of a video coder according to Embodiment 7 of the present invention. This apparatus includes a coding section 702 and a processing time control unit 70 in lieu to the coding section 102 and the processing time control unit 10 shown in FIG. 1. The other elements are the same as those in FIG. 1.

The coding section 702 outputs a data storage signal when starting loading video data for one picture, outputs a start signal when starting coding the loaded video data, outputs an end signal when completing coding of the video data for one picture, outputs a partial data storage signal when starting loading a part (for example, data in slice unit) of one piece of video data, outputs a partial start signal when starting coding the loaded part of the video data, and outputs a partial end signal when completing coding of the part of the video data.

Further, the coding section 702 has two coding modes of a normal mode and a partial compact mode, and the coding mode is set to either mode by the coding control section 704. When the coding code is set to the normal mode, the coding section 702 encodes video data to be coded next in accordance with the normal mode coding scheme. In contrast, when the coding mode is set to the partial compact mode, the coding section 702 encodes video data to be coded next in accordance with a partial compact mode coding scheme. The partial compact mode coding scheme is shorter than the normal mode coding scheme in time required for coding.

The processing time measuring section 703 measures a coding time period with the use of the start signal and the end signal output from the coding section 702. Further, the processing time measuring section 703 uses the partial start signal and the partial end signal output from the coding section 702 for calculating a time period (a partial coding time period) required for coding a part of video data. For example, the processing time measuring section 703 measures a time period from the time when the head of slice lines is stored (at which a partial start signal is received from the coding section 702) to the time when a partial end signal is received from the coding section 702.

The coding control section 704 calculates time (expected time) which can be used for coding video data on the basis of the frame rate of the video data. Further, the coding; control section 704 calculates time (partial expected time) which can be used for coding a part of video data on the basis of the frame rate of the video data. For example, upon receipt of a partial data storage signal from the coding section 702, the coding control section 704 obtains time at which the coding control section 704 must complete coding of a part of the video data on the basis of the frame rate and calculates a time period from the time when the partial end signal is received from the coding section 702 to the thus obtained time. The coding control section 704 then compares the coding time period measured by the processing time measuring section 703 with the thus calculated expected time, compares the partial coding time period measured by the processing time measuring section 703 with the thus calculated partial expected time, and changes the coding mode of the coding section 702 according to the comparison results.

(Partial Compact Coding Processing)

Figure 27:
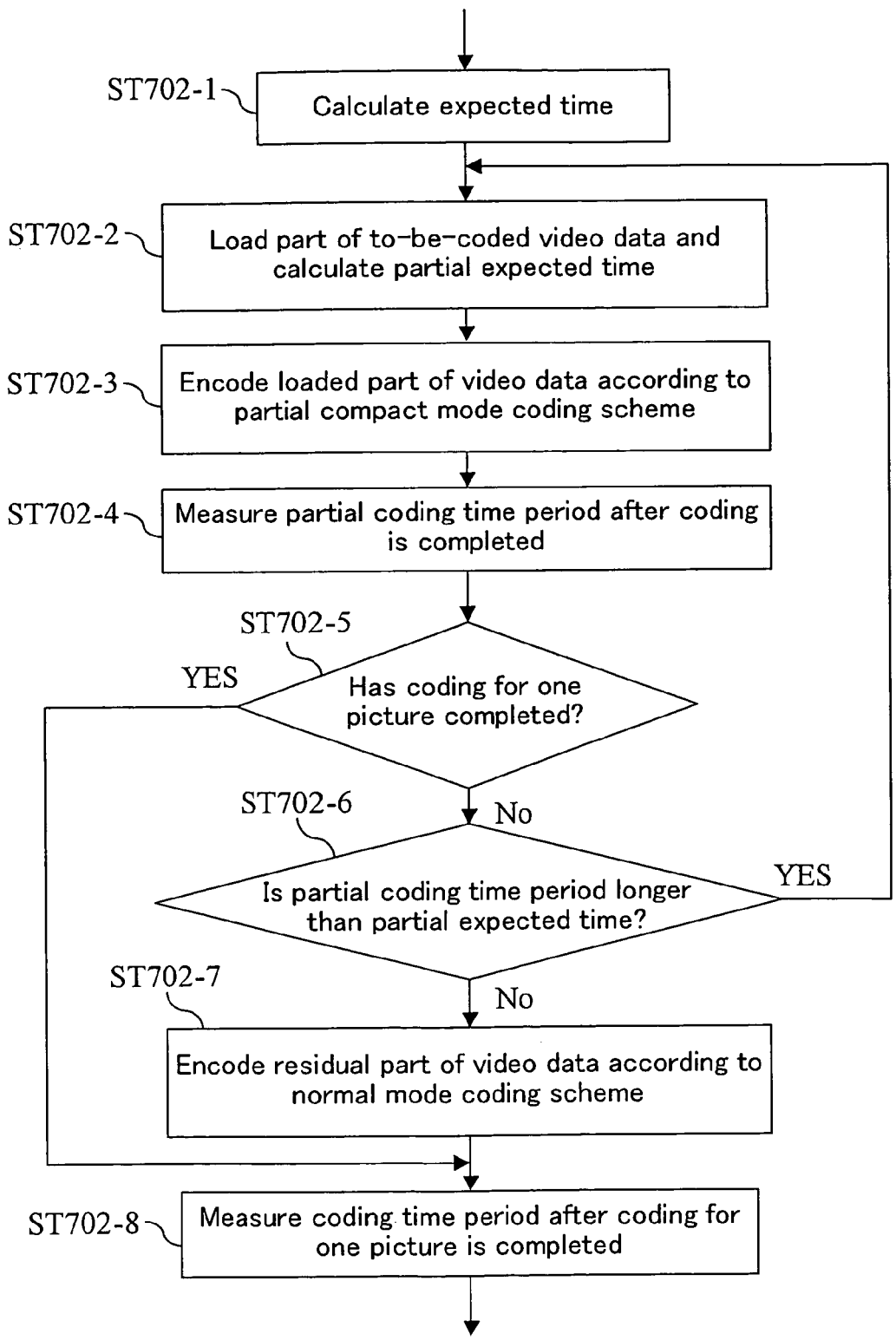
FIG. 27 is a flowchart for depicting an operation of the video coder shown in FIG. 26.

Processing by the coding section 702 and the coding control section 704 shown in FIG. 26 in the partial compact mode will be described here with reference to FIG. 27.
<Step ST702-1>Upon receipt of a data storage signal from the coding section 702, the coding control section 704 set to the partial compact mode calculates expected time on the basis of the frame rate of the video data.
<Step ST702-2>Next, the coding section 702 loads a part of video data to be coded next. At that time, the coding section 702 outputs a partial data storage signal. The coding control section 704 calculates time (partial expected time) which can be used for coding the part of the video data.
<Step ST702-3>Subsequently, the coding section702 starts coding the loaded part of the video data in accordance with the partial compact mode coding scheme. At that time, the coding section 702 outputs a partial start signal.
<Step ST702-4>

When completing coding of the part of the video data, the coding section 702 outputs a partial end signal. Upon receipt of the partial end signal from the coding section 702, the processing time measuring section 703 measures a time period (a partial coding time period) which has been used for coding the part of the video data by the coding section 702.

\<Step ST702-5\>

Next, the coding control section 704 judges whether or not the coding section 702 has completed coding of the video data for one picture. For example, the coding control section 704 judges whether or not an end signal is output from the coding section 704. If coding of the video data for one picture is completed, the routine proceeds to a step ST702-8. Otherwise, the routine proceeds to a step ST702-6.

\<Step ST702-6\>

The coding control section 704 then judges whether or not the coding time period in the coding section 702 falls within the expected time. In detail, the coding control section 704 judges whether or not the partial coding time period measured by the processing time measuring section 703 is longer than the partial expected time calculated in the step ST702-2. If the partial coding time period is longer than the partial expected time, the routine returns to the step ST702-2. Otherwise, the routine proceeds to a step ST702-7.

\<Step ST702-7\>

The coding control section 704 changes the coding mode of its own and the coding mode of the coding section 702 form "the partial compact mode" to "the normal mode." The coding section 702 encodes the residual part of the video data in accordance with the normal mode coding scheme.

\<Step ST702-8\>

When completing coding of the video data for one picture, the coding section 702 outputs an end signal. The coding control section 704 measures a coding time period with the use of the start signal and the end signal output from the coding section 702.

Figure 29:
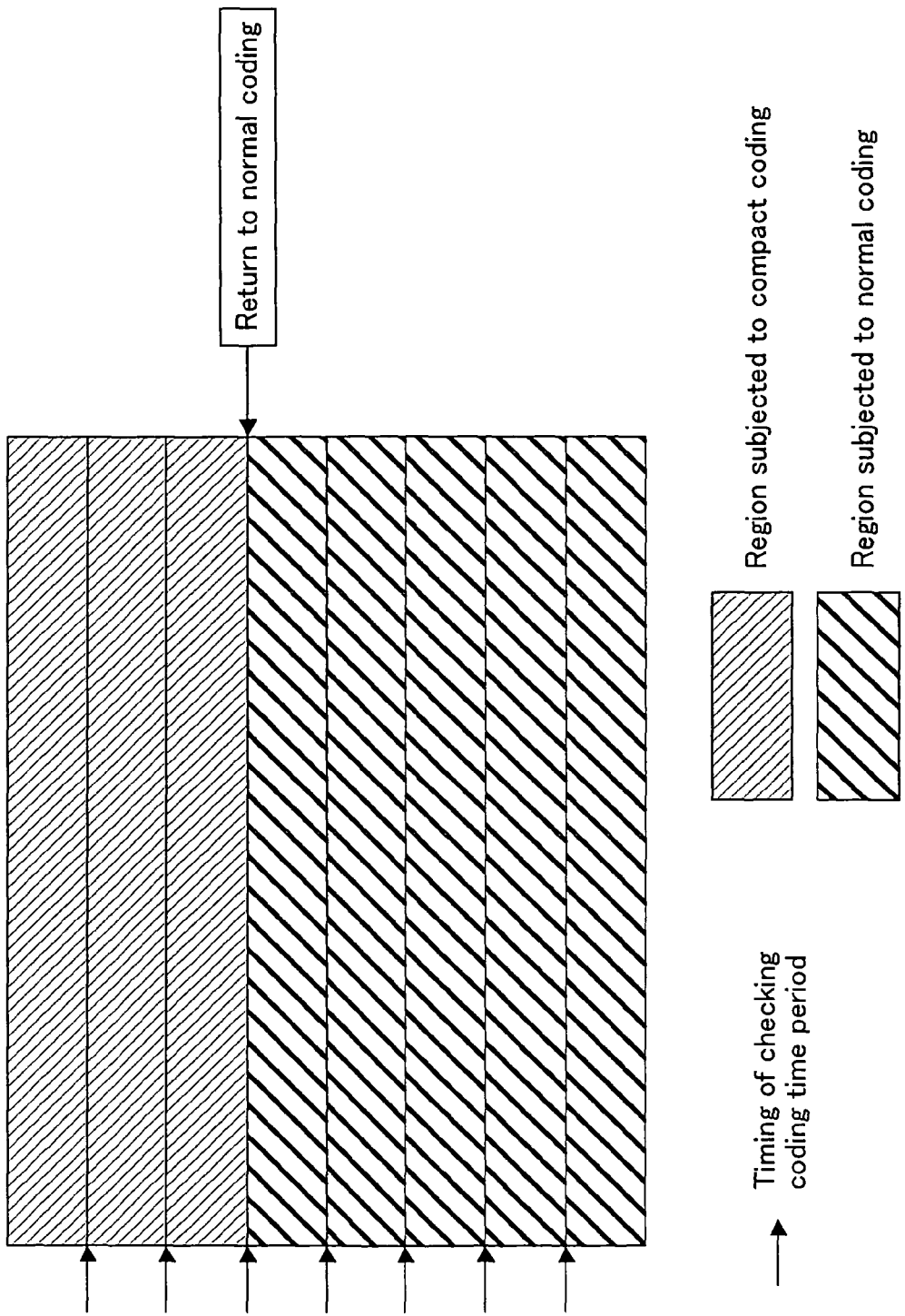
FIG. 29 is a diagram for depicting the processing shown in FIG. 27.

In this way, as shown in FIG. 29, coding in accordance with the partial compact mode coding scheme is performed until the partial coding time period falls within the partial expected time, and coding in accordance with the normal mode coding scheme is performed after the partial coding time period falls within the partial expected time.

(Operation)

Figure 28:
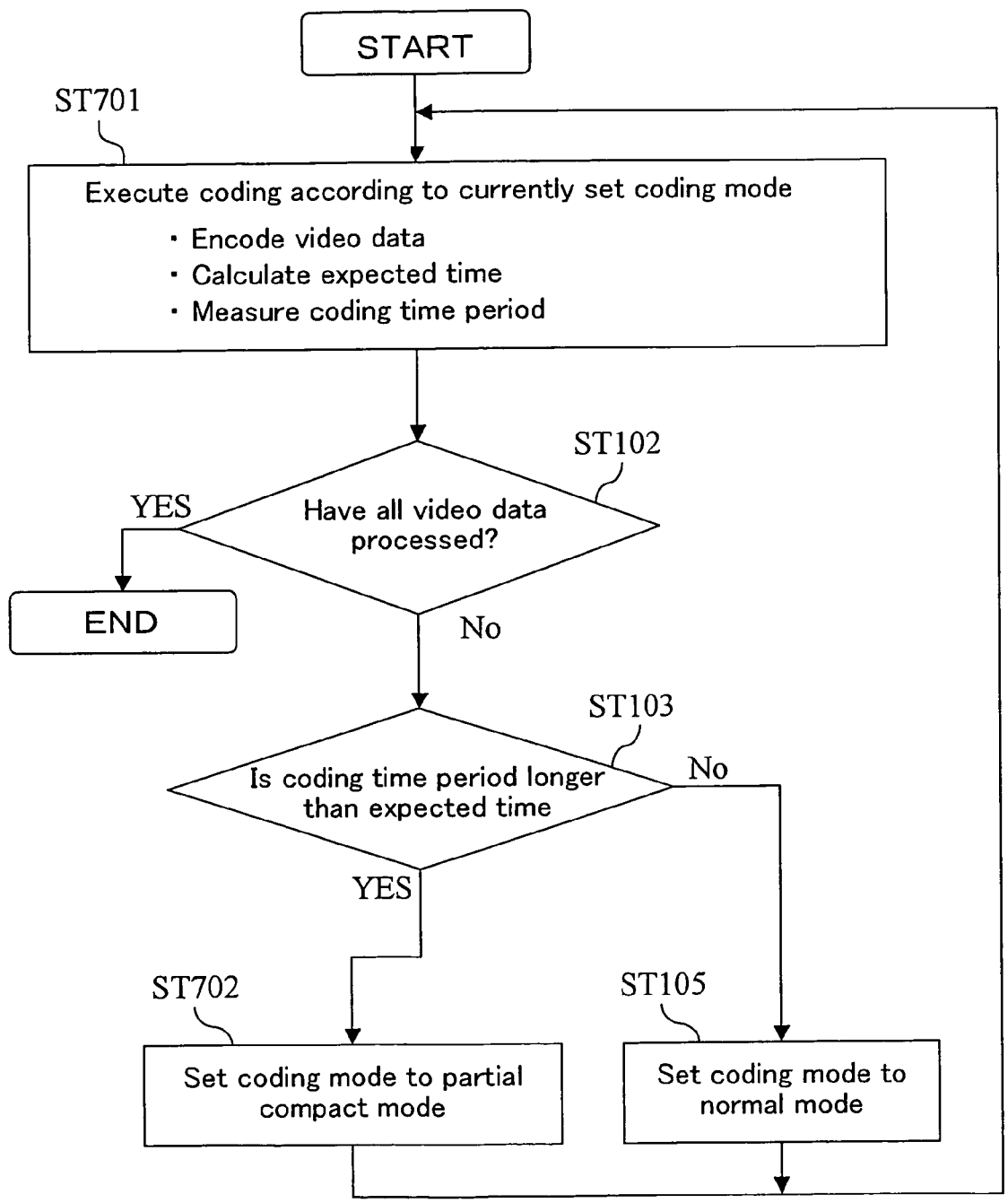
FIG. 28 is a flowchart for depicting partial compact coding processing shown in FIG. 27.

An operation of the video coder shown in FIG. 26 will be described next with reference to FIG. 28.

\<Step ST701\>

First, the coding section 702 and the coding control section 704 execute the coding processing (the normal coding processing or the partial compact coding processing) according to the currently set coding mode.

\<Step ST102\>

Next, if all video data stored in the frame memory 101 have been coded, the processing terminates. Otherwise, the routine proceeds to the step ST103.

\<Step ST103\>

Subsequently, the coding control section 704 judges whether or not a coding time period measured by the processing time measuring section 703 is longer than the calculated expected time. If the coding time period is longer than the expected time, the routine proceeds to a step ST702. Otherwise, the routine returns to the step ST105.

\<Step ST702\>

The coding control section 704 sets the coding mode of its own and the coding mode of the coding section 702 to "the partial compact mode." The routine then returns to the step ST701.

\<Step ST105\>

On the other hand, when it is judged that the coding time period is not longer than the expected time, the coding control section 704 sets the coding mode of its own and the coding mode of the coding section 702 to "the normal mode." Then, the routine returns to the step ST701.

(Effects)

As described above, whether or not the coding time period is longer than the expected time is judged every time when coding of a part of video data is completed. This enables the coding mode to return to the normal mode before coding of the video data for one picture is completed. As a result, the coding time period is prevented from being reduced excessively, thereby suppressing degradation of image quality and the like.

The video coder according to the present invention attains reduction in coding time period, thereby preventing image noise and system breakdown which are due to a rare increase in processing amount caused by an external factor. Hence, the video coder of the present invention is useful for system insurance and the like in case of occurrence of coding abnormality in an arithmetic unit operating at low frequencies.

What is claimed is:

1. A video coder for coding plural pieces of video data, comprising:

a coding section for coding the plural pieces of video data sequentially;

a measuring section for measuring a time period which the coding section has used for coding video data; and a control section for judging whether or not the time period measured by the measuring section is longer than a predetermined time based on a frame rate of the video data and for selecting, when the time period measured by the measuring section is judged to be longer than the predetermined time, at least one piece of video data to be coded after the video data coded by the coding section out of the plural pieces of video data, and for generating a predetermined bit stream instead of encoded data of the selected video data without allowing the coding section to encode the selected data, wherein the coding section has a first coding scheme and a second coding scheme which requires coding time shorter than the first coding scheme, the control section compares the time period measured by the measuring section with a first predetermined time based on a frame rate of the video data and a second predetermined time shorter than the first predetermined time, selects, when the time period measured by the measuring section is judged to be longer than the first predetermined time, at least one piece of video data to be coded after the video data coded by the coding section out of the plural pieces of video data, and generates the predetermined bit stream instead of coding data of the selected video data without allowing the coding section to encode the selected data, and the control section selects, when the time period measured by the measuring section is judged not to be longer than the first predetermined time and to be longer than the second predetermined time, at least one piece of video data to be coded after the video data coded by the coding section out of the plural pieces of video data, and allows the coding section to encode the selected video data in accordance with the second coding scheme.

2. The video coder of claim 1, wherein the plural pieces of video data include a to-be-referenced picture to be referenced for coding another piece of video data and a referencing picture to be subjected to inter-frame predictive coding by referencing the to-be-referenced picture, the video coder further comprising:

a picture type judging section for judging a picture type of each of the plural pieces of video data; and a reference time setting section for setting the first and second predetermined times to be compared with the time period measured by the measuring section to first and second reference times, respectively, according to a picture type judgment result by the picture type judging section, wherein the control section compares the time period measured by the measuring section with the first and second reference times set by the reference time setting section.

3. A video coder for coding plural pieces of video data, comprising:

a coding section for coding the plural pieces of video data sequentially;

a measuring section for measuring a time period which the coding section has used for coding video data;

a control section for judging whether or not the time period measured by the measuring section is longer than a predetermined time based on a frame rate of the video data and for selecting, when the time period measured by the measuring section is judged to be longer than the predetermined time, at least one piece of video data to be coded after the video data coded by the coding section out of the plural pieces of video data, and for generating a predetermined bit stream instead of encoded data of the selected video data without allowing the coding section to encode the selected data; and a picture type judging section, wherein the plural pieces of video data include a first to-be-referenced picture to be referenced for coding another piece of video data, a second to-be-referenced picture to be coded after the first to-be-referenced picture, a third to-be-referenced picture to be coded after the second to-be-referenced picture, a referencing picture which is present between the first to-be-referenced picture and the second to-be-referenced picture and is to be subjected to bidirectional inter-frame predictive coding by referencing the first and second to-be-referenced pictures, and another referencing picture which is present between the second to-be-referenced picture and the third to-be-referenced picture and is to be subjected to bidirectional inter-frame predictive coding by referencing the second and third to-be-referenced pictures, the picture type judging section judges a picture type of each of the plural pieces of video data, the measuring section measures a total time period of a time period which the coding section has used for coding video data judged as the first to-be-referenced picture by the picture type judging section and a time period which the coding section has used for coding video data present between the video data judged as the first to-be-referenced picture by the picture type judging section and video data judged as the second to-be-referenced picture by the picture type judging section, and when the total time period measured by the measuring section is judged to be longer than a predetermined total time based on a frame rate of the video data, the control section generates the predetermined bit stream instead of the video data judged as the second to-be-referenced picture by the picture type judging section without allowing the coding section to encode the video data judged as the second to-be-referenced picture by the picture type judging section and generates the predetermined bit stream instead of the video data without allowing the coding section to encode a referencing picture present between the video data judged as the second to-be-referenced picture by the picture type judging section and video data judged as the third to-be-referenced picture by the picture type judging section.

4. A video coder for coding plural pieces of video data, comprising:

a coding section for coding the plural pieces of video data sequentially;

a measuring section for measuring a time period which the coding section has used for coding video data;

a control section for judging whether or not the time period measured by the measuring section is longer than a predetermined time based on a frame rate of the video data and for selecting, when the time period measured by the measuring section is judged to be longer than the predetermined time, at least one piece of video data to be coded after the video data coded by the coding section out of the plural pieces of video data, and for generating a predetermined bit stream instead of encoded data of the selected video data without allowing the coding section to encode the selected data; and a picture type judging section, wherein the plural pieces of video data include a first to-be-referenced picture to be referenced for coding another picture, a second to-be-referenced picture to be coded after the first to-be-referenced picture, and a referencing picture which is present between the first to-be-referenced picture and the second to-be-referenced picture and is to be subjected to inter-frame predictive coding by referencing the first and second to-be-referenced pictures, the picture type judging section judges a picture type of each of the plural pieces of video data, the coding section further has a first predictive coding scheme and a second predictive coding scheme, the coding section performing bidirectional inter-frame predictive coding on the referencing picture present between the first and second to-be-referenced pictures by referencing the first and second to-be-referenced pictures in the first predictive coding and performing inter-frame predictive coding on the referencing picture present between the first and second to-be-referenced pictures by referencing one of the first and second to-be-referenced pictures for which the predetermined bit steam is not generated without performing bidirectional inter-frame predictive coding thereon in the second predictive coding, and the control section changes the coding scheme of the coding section to the second predictive coding scheme when the predetermined bit stream is generated instead of coding of the video data judged as first or second to-be-referenced picture by the picture type judging section.

5. The video coder of claim 4, wherein the plural pieces of video data further include a third to-be-referenced picture to be coded after the second to-be-referenced picture and another referencing picture which is present between the second to-be-referenced picture and the third to-be-referenced picture and is to be subjected to inter-frame predictive coding by referencing the second and third to-be-referenced pictures, the coding section performs bidirectional predictive coding on a referencing picture present between the first to-be-referenced picture and the second to-be-referenced picture by referencing the first and second to-be-referenced pictures or performs bidirectional predictive coding on a referencing picture present between the second to-be-referenced picture and the third to-be-referenced picture by referencing the second and third tobe-referenced pictures in the first predictive coding scheme, and the coding section performs inter-frame predictive coding on a referencing picture present between the first to-be-referenced picture and the second to-be-referenced picture by referencing the second to-be-referenced picture without performing bidirectional inter-frame predictive coding thereon or performs inter-frame predictive coding on a referencing picture present between the second to-be-referenced picture and the third to-be-referenced picture by referencing the third to-be-referenced picture without performing bidirectional inter-frame predictive coding thereon in the second predictive coding scheme, and the control section changes the coding scheme of the coding section to the second predictive coding scheme when the predetermined bit stream is generated instead of coding of video data judged as the second to-be-referenced picture by the picture type judging section.

6. A video coder for coding plural pieces of video data, comprising:

a coding section having a first coding scheme and a second coding scheme which requires time for coding shorter than the first coding scheme, the coding section being for sequentially coding the plural pieces of video data in accordance with either one of the first and second coding schemes;

a measuring section for measuring a time period which the coding section has used for coding video data; and a control section for judging whether or not the time period measured by the measuring section is longer than a predetermined time based on a frame rate of the video data, for selecting, when the time period measured by the measuring section is judged to be longer than the predetermined time, at least one piece of video data to be coded after the video data coded by the coding section out of the plural pieces of video data, and for allowing the coding section to encode the selected video data in accordance with the second coding scheme, wherein the coding section further has a third coding scheme which requires time for coding shorter than the second coding scheme, the control section compares the time period measured by the measuring section with a first predetermined time based on a frame rate of the video data and a second predetermined time longer than the first predetermined time, the control section selects, when the time period measured by the measuring section is judged to be longer than the first predetermined time, at least one piece of video data to be coded after the video data coded by the coding section out of the plural pieces of video data and allows the coding section to encode the selected video data in accordance with the third coding scheme, and the control section selects, when the time period measured by the measuring section is judged not to be longer than the first predetermined time and to be longer than the second predetermined time, at least one of video data to be coded after the video data coded by the coding section out of the plural pieces of video data and allows the coding section to encode the selected video data in accordance with the second coding scheme.

7. The video coder of claim 6, wherein the plural pieces of video data include a to-be-referenced picture to be referenced for coding another piece of video data and a referencing picture to be subjected to inter-frame predictive coding by referencing the to-be-referenced picture, the video coder further comprising:

a picture type judging section for judging a picture type of each of the plural pieces of video data; and a reference time setting section for setting the first and second predetermined times to be compared with the time period measured by the measuring section to first and second reference times, respectively, according to a picture type detection result by the picture type detecting section, wherein the control section compares the time period measured by the measuring section with the first and second reference times set by the reference time setting section.

8. A video coder for coding plural pieces of video data, comprising:

a coding section having a first coding scheme and a second coding scheme which requires time for coding shorter than the first coding scheme, the coding section being for sequentially coding the plural pieces of video data in accordance with either one of the first and second coding schemes;

a measuring section for measuring a time period which the coding section has used for coding video data;

a control section for judging whether or not the time period measured by the measuring section is longer than a predetermined time based on a frame rate of the video data, for selecting, when the time period measured by the measuring section is judged to be longer than the predetermined time, at least one piece of video data to be coded after the video data coded by the coding section out of the plural pieces of video data, and for allowing the coding section to encode the selected video data in accordance with the second coding scheme; and a picture type judging section, wherein the plural pieces of video data include a first to-be-referenced picture to be referenced for coding another picture, a second to-be-referenced picture to be coded after the first to-be-referenced picture, a third to-be-referenced picture to be coded after the second to-be-referenced picture, a referencing picture which is present between the first to-be-referenced picture and the second to-be-referenced picture and is to be subjected to inter-frame predictive coding by referencing the first and second to-be-referenced pictures, and another referencing picture which is present between the second to-be-referenced picture and the third to-be-referenced picture and is to be subjected to inter-frame predictive coding by referencing the second and third to-be-referenced pictures, the picture type judging section judges a picture type of each of the plural pieces of video data, the measuring section measures a total time period of a time period which the coding section has used for coding video data judged as the first to-be-referenced picture by the picture type judging section and a time period which the coding section has used for coding video data present between the video data judged as the first to-be-referenced picture by the picture type judging section and video data judged as the second to-be-referenced picture by the picture type judging section, and when the total time period measured by the measuring section is judged to be longer than predetermined total time, the control section allows the coding section to encode the video data judged as the second to-be-referenced picture by the picture type judging section in accordance with the second coding scheme or allows the coding section to encode a referencing picture present between the video data judged as the second to-be-referenced picture by the picture type judging section and video data judged as the third to-be-referenced picture by the picture type judging section in accordance with the second coding scheme.

9. A video coder for coding plural pieces of video data, comprising:
a coding section having a first coding scheme and a second coding scheme which requires time for coding shorter than the first coding scheme, the coding section being for sequentially coding the plural pieces of video data in accordance with either one of the first and second coding schemes;
a measuring section for measuring a time period which the coding section has used for coding video data;
a control section for judging whether or not the time period measured by the measuring section is longer than a predetermined time based on a frame rate of the video data, for selecting, when the time period measured by the measuring section is judged to be longer than the predetermined time, at least one piece of video data to be coded after the video data coded by the coding section out of the plural pieces of video data, and for allowing the coding section to encode the selected video data in accordance with the second coding scheme; and
a picture type judging section,
wherein the plural pieces of video data include a first to-be-referenced picture to be referenced for coding another piece of video data, a second to-be-referenced picture to be coded after the first to-be-referenced picture, and a referencing picture which is present between the first to-be-referenced picture and the second to-be-referenced picture and is to be subjected to inter-frame predictive coding by referencing the first and second to-be-referenced pictures,
the picture type judging section judges a picture type of each of the plural pieces of video data,
the coding section further has a first predictive coding scheme and a second predictive coding scheme, the coding section performing bidirectional inter-frame predictive coding on a referencing picture present between the first and second to-be-referenced pictures by referencing the first and second to-be-referenced pictures in the first predictive coding scheme and performing inter-frame predictive coding on a referencing picture present between the first and second to-be-referenced pictures by referencing either one of the first and second to-be-referenced pictures which is not coded in accordance with the second coding scheme without performing bidirectional inter-frame predictive coding thereon in the second predictive coding scheme, and
after the coding section encodes video data judged as the second to-be-referenced picture by the picture type judging section in accordance with the second coding scheme, the control section sets the coding scheme of the coding section to the second predictive coding scheme.

10. The video coder of claim 9,
wherein the plural pieces of video data further include a third to-be-referenced picture to be coded after the second to-be-referenced picture and another referencing picture which is present between the second to-be-referenced picture and the third to-be-referenced picture and is to be subjected to inter-frame predictive coding by referencing the second and third to-be-referenced pictures,
the coding section performs bidirectional predictive coding on a referencing picture present between the first to-be-referenced picture and the second to-be-referenced picture by referencing the first and second to-be-referenced pictures or performs bidirectional predictive coding on a referencing picture present between the second to-be-referenced picture and the third to-be-referenced picture by referencing the second and third to-be-referenced pictures in the first predictive coding scheme, and the coding section performs inter-frame predictive coding on a referencing picture present between the first to-be-referenced picture and the second to-be-referenced picture by referencing the second to-be-referenced picture without performing bidirectional inter-frame predictive coding thereon or performs inter-frame predictive coding on a referencing picture present between the second to-be-referenced picture and the third to-be-referenced picture by referencing the third to-be-referenced picture without performing bidirectional inter-frame predictive coding thereon in the second predictive coding scheme, and
after the coding section encodes video data judged as the second to-be-referenced picture by the picture type judging section in accordance with the second coding scheme, the control section sets the coding scheme of the coding section to the second predictive coding section.

* * * * *